United States Patent
Takeda

(10) Patent No.: US 11,072,331 B2
(45) Date of Patent: Jul. 27, 2021

(54) VEHICLE CONTROL DEVICE, VEHICLE CONTROL METHOD AND VEHICLE CONTROL PROGRAM

(71) Applicant: HONDA MOTOR CO., LTD., Tokyo (JP)

(72) Inventor: Masanori Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 16/081,074

(22) PCT Filed: Mar. 8, 2017

(86) PCT No.: PCT/JP2017/009197
§ 371 (c)(1),
(2) Date: Aug. 30, 2018

(87) PCT Pub. No.: WO2017/159487
PCT Pub. Date: Sep. 21, 2017

(65) Prior Publication Data
US 2019/0077404 A1 Mar. 14, 2019

(30) Foreign Application Priority Data
Mar. 14, 2016 (JP) .............................. JP2016-050164

(51) Int. Cl.
*B60W 30/18* (2012.01)
*B62D 15/02* (2006.01)
(Continued)

(52) U.S. Cl.
CPC ...... *B60W 30/18163* (2013.01); *B60W 10/04* (2013.01); *B60W 10/20* (2013.01);
(Continued)

(58) Field of Classification Search
CPC ....... B60W 30/18163; B60W 30/0956; B60W 2554/4041; B60W 2554/804;
(Continued)

(56) References Cited

U.S. PATENT DOCUMENTS 10,663,971 B2 *  5/2020  Sugawara .......... G06K 9/00798

FOREIGN PATENT DOCUMENTS

| CN | 101396968 | 4/2009 |
| CN | 102424017 | 4/2012 |

(Continued)

OTHER PUBLICATIONS

International Search Report and Written Opinion for International Patent Application No. PCT/JP2017/009197 dated May 30, 2017, 9 pages.
(Continued)

*Primary Examiner* — Maceeh Anwari
(74) *Attorney, Agent, or Firm* — Amin, Turocy & Watson, LLP

(57) ABSTRACT

A vehicle control device includes a setting part that sets a target area which is an area used as a target when the host vehicle changes lane, a derivation part that derives a first time period which is a time length required from a start to a termination of a lane change by the host vehicle, and a second time period which is a time length required for a following reference vehicle, traveling at rear of the target area, to catch up with a preceding vehicle traveling in front of the host vehicle, a determination part that determines that the lane change by the host vehicle is possible, in a case at least a condition in which that the first time period is shorter than the second time period is satisfied, and a controller that performs the lane change of the host vehicle.

9 Claims, 15 Drawing Sheets

(51) Int. Cl.
  *B60W 10/04* (2006.01)
  *B60W 10/20* (2006.01)
  *G08G 1/16* (2006.01)
  *B60W 30/10* (2006.01)
  *B60W 30/095* (2012.01)
  *G05D 1/00* (2006.01)

(52) U.S. Cl.
  CPC ........ *B60W 30/0956* (2013.01); *B60W 30/10* (2013.01); *B62D 15/025* (2013.01); *B62D 15/0255* (2013.01); *B62D 15/0265* (2013.01); *G05D 1/0088* (2013.01); *G08G 1/16* (2013.01); *G08G 1/166* (2013.01); *G08G 1/167* (2013.01); *B60W 2554/4041* (2020.02); *B60W 2554/804* (2020.02); *G05D 2201/0213* (2013.01)

(58) Field of Classification Search
  CPC ..... B60W 2710/207; B60W 2720/106; B60W 30/0953; B60W 2554/80; B60W 30/10; B60W 10/20; B60W 10/04; B62D 15/025; B62D 15/0255; B62D 15/0265; G08G 1/16; G08G 1/167; G08G 1/166; G05D 1/0088; G05D 2201/0213

USPC .......................................................... 701/23
See application file for complete search history.

(56) References Cited

FOREIGN PATENT DOCUMENTS

| | | |
|---|---|---|
| CN | 104709283 | 6/2015 |
| CN | 105292116 | 2/2016 |
| JP | 2006-123795 | 5/2006 |
| JP | 2013-109446 | 6/2013 |
| JP | 2014-061792 | 4/2014 |
| JP | 2015-066963 | 4/2015 |
| JP | 02017074823 A * | 10/2015 |
| JP | 2016-000602 | 1/2016 |

OTHER PUBLICATIONS

Chinese Office Action for Chinese Patent Application No. 201780014441.9 dated Nov. 19, 2020.

\* cited by examiner

VEHICLE CONTROL DEVICE, VEHICLE CONTROL METHOD AND VEHICLE CONTROL PROGRAM

TECHNICAL FIELD

The present invention relates to a vehicle control device, a vehicle control method and a vehicle control program.

Priority is claimed on Japanese Patent Application No. 2016-050164, filed Mar. 14, 2016, the content of which is incorporated herein by reference.

BACKGROUND ART

In recent years, research has been performed on a technology for automatically driving a vehicle such as a four-wheeled vehicle.

In this regard, a lane change assisting device is known which includes a lane change determining unit having a function of determining whether an inter-vehicle distance from a following vehicle is a lane change determining distance, which is a reference for determining whether lane change is possible, or more, and performing determination that an operation of a fuel consumption saving function is to be released when the inter-vehicle distance is the lane change determining distance or more, when information that the driver intends to change lane is input in a case in which a following vehicle is recognized in an adjacent lane during traveling when a fuel consumption saving function is operated, and a vehicle control unit configured to control traveling in which the fuel consumption saving function is operated or conventional traveling on the basis of determination of the lane change determining unit (for example, see Patent Literature 1).

CITATION LIST

Patent Literature

[Patent Literature 1]
  Japanese Unexamined Patent Application, First Publication No. 2013-109446
[Patent Literature 2]
  Japanese Unexamined Patent Application, First Publication No. 2006-123795

SUMMARY OF INVENTION

Technical Problem

However, in the technology of the related art, a lane of a host vehicle may not be changed at an appropriate timing according to a state of neighboring vehicles.

An aspect of the present invention is directed to providing a vehicle control device, a vehicle control method and a vehicle control program, in which a lane of a host vehicle is able to be changed at an appropriate timing according to a state of neighboring vehicles.

Solution to Problem (1) A vehicle control device according to an aspect of the present invention includes: a setting part that sets a target area on an adjacent lane adjacent to a host vehicle traveling lane on which a host vehicle is traveling, the target area being an area used as a target when the host vehicle changes lane to the adjacent lane; a derivation part that derives a first time period which is a time length required from a start to a termination of a lane change by the host vehicle, and a second time period which is a time length required for a following reference vehicle, traveling at rear of the target area set by the setting part in the adjacent lane adjacent to the host vehicle traveling lane, to catch up with a preceding vehicle traveling in front of the host vehicle in the host vehicle traveling lane; a determination part that determines that the lane change by the host vehicle is possible, in a case at least a condition in which the first time period derived by the derivation part is shorter than the second time period is satisfied; and a controller that performs the lane change of the host vehicle, in a case it is determined by the determination part that the lane change by the host vehicle is possible.

(2) In the aspect of (1), the controller may automatically perform the lane change of the host vehicle to the adjacent lane by automatically controlling at least one of an acceleration and a deceleration, or a steering of the host vehicle on the basis of the first time period and the second time period derived by the derivation part.

(3) In the aspect of (1) or (2), the setting part may set the target area at rear of the following reference vehicle when a speed of the following reference vehicle is greater than that of the host vehicle, in a case it is determined by the determination part that the lane change by the host vehicle is not possible.

(4) In the aspect of (3), the controller may set the speed of the host vehicle to maximum in a range of a fluctuation range of the speed which varies according to the speed of the following reference vehicle at a timing on which the host vehicle travels parallel with the preceding vehicle on the adjacent lane, in a case the target area has been set at rear of the following reference vehicle.

(5) In the aspect of any one of (1) to (4), the controller may generate a trajectory for traveling the host vehicle to the target area on the basis of the first time period and the second time period derived by the derivation part, and the controller may automatically perform the lane change of the host vehicle to the adjacent lane by automatically controlling at least one of an acceleration and a deceleration, or a steering of the host vehicle on the basis of the generated trajectory, in a case it is determined by the determination part that the lane change by the host vehicle is possible.

(6) In the aspect of (5), the condition may further include a condition in which any one of the preceding vehicle, the following reference vehicle, or a preceding reference vehicle which is traveling in front of the target area does not interfere with the host vehicle, in a case the host vehicle is traveling on the trajectory generated by the controller.

(7) In the aspect of any one of (1) to (6), the derivation part may derive the first time period on the basis of one or both of a movement amount, which is required for a movement of the host vehicle in order to move to the target area on the adjacent lane from a located position of the host vehicle, and a direction of the host vehicle with respect to the host vehicle traveling lane.

(8) A method installed in a computer configured to control a vehicle according to an aspect of the present invention, the method including: setting a target area on an adjacent lane adjacent to a host vehicle traveling lane on which a host vehicle is traveling, the target area being an area used as a target when the host vehicle changes lane to the adjacent lane; deriving a first time period which is a time length required from a start to a termination of a lane change by the host vehicle, and a second time period which is a time length required for a following reference vehicle, traveling at rear of the set target area set in the adjacent lane adjacent to the host vehicle traveling lane, to catch up with a preceding vehicle traveling in front of the host vehicle in the host vehicle traveling lane; determining that the lane change by the host vehicle is possible, in a case at least a condition in which the derived first time period is shorter than the second time period is satisfied; and performing the lane change of the host vehicle, in a case it is determined that the lane change by the host vehicle is possible.

(9) A vehicle control program according to an aspect of the present invention is installed in an in-vehicle computer and configured to perform: processing of setting a target area on the adjacent lane adjacent to a host vehicle traveling lane on which a host vehicle is traveling, the target area being an area used as a target when the host vehicle changes lane to the adjacent lane; processing of deriving a first time period which is a time length required from a start to a termination of a lane change by the host vehicle, and a second time period which is a time length required for a following reference vehicle, traveling at rear of the set target area set in the adjacent lane adjacent to the host vehicle traveling lane, to catch up with a preceding vehicle traveling in front of the host vehicle in the host vehicle traveling lane; processing of determining that the lane change by the host vehicle is possible, in a case at least a condition in which the derived first time period is shorter than the second time period is satisfied; and processing of performing the lane change of the host vehicle, in a case it is determined that the lane change by the host vehicle is possible.

Advantageous Effects of Invention

According to the aspects of (1), (8) and (9), when the first time period that is a time length required from a start to a termination of the lane change of the host vehicle is shorter than the second time period which is a time length required for the following reference vehicle, traveling at rear of the target area in the adjacent lane, to catch up with the preceding vehicle, since it is determined that the lane change by the host vehicle is possible, the lane change of the host vehicle can be performed at an appropriate timing according to a state of the neighboring vehicle.

According to the aspects of (2) and (5), as acceleration, deceleration or steering of the host vehicle is controlled on the basis of the first time period and the second time period, since the lane of the host vehicle is automatically changed to the adjacent lane, the lane change of the host vehicle can be performed at a more appropriate timing.

According to the aspect of (3), in the case it is determined that the lane change by the host vehicle is not possible, when the speed of the following reference vehicle is larger than that of the host vehicle, since the target area is set at rear of the following reference vehicle, the host vehicle can perform a lane change toward the target area that is set at rear of the following reference vehicle.

According to the aspect of (4), when the target area is set at rear of the following reference vehicle, since the speed of the host vehicle is set to maximum in a range of a fluctuation range of the speed which varies according to the speed of the following reference vehicle at the timing on which the host vehicle travels parallel with the preceding vehicle on the adjacent lane, the time on which the host vehicle is traveling parallel with the preceding vehicle can be reduced. As a result, a degree of influence of the lane change of the host vehicle with respect to the traveling of the neighboring vehicle can be decreased.

According to the aspect of (6), when the host vehicle travels on the generated trajectory, as it is determined whether the lane change by the host vehicle is possible by determining whether the host vehicle interferes with any one of the preceding vehicle, the following reference vehicle and the preceding reference vehicle, the lane of the host vehicle can be changed at a more appropriate timing.

According to the aspect of (7), since the first time period is derived on the basis of either one or both of the movement amount, which is required for a movement of the host vehicle in order to move to the target area from the located position of the host vehicle, and the direction of the host vehicle with respect to the host vehicle traveling lane, the first time period can be accurately derived according to a traveling state of the host vehicle. As a result, the lane change of the host vehicle can be performed at a more appropriate timing.

DESCRIPTION OF EMBODIMENTS

Hereinafter, embodiments of a vehicle control device, a vehicle control method and a vehicle control program of the present invention will be described with reference to the accompanying drawings.

First Embodiment

[Vehicle Configuration]

Figure 1:
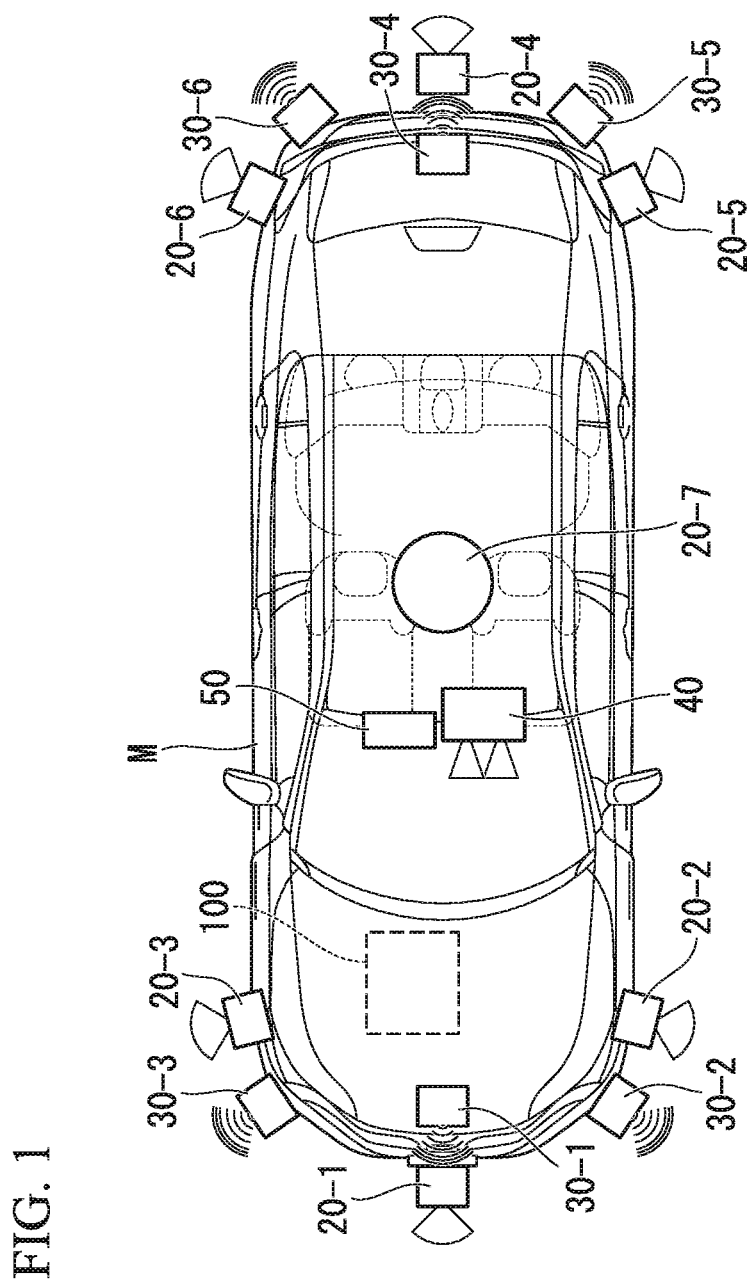
FIG. 1 is a figure showing components provided in a host vehicle on which a vehicle control device according to a first embodiment is mounted.

FIG. 1 is a figure showing components provided in a vehicle on which a vehicle control device 100 according to a first embodiment is mounted (hereinafter, referred to as a host vehicle M). The vehicle on which the vehicle control device 100 is mounted is an automobile such as a two-wheeled, three-wheeled, or four-wheeled vehicle, or the like, and includes an automobile using an internal combustion engine such as a diesel engine, a gasoline engine, or the like, as a power source, an electric automobile using an electric motor as a power source, a hybrid automobile including both of an internal combustion engine and an electric motor, and so on. The electric automobile is driven using electric power discharged by a battery such as a secondary battery, a hydrogen fuel cell, a metal fuel cell, an alcohol fuel cell, or the like.

As shown in FIG. 1, sensors such as finders 20-1 to 20-7, radars 30-1 to 30-6, a camera 40, and so on, a navigation device 50, and the vehicle control device 100 are mounted on the host vehicle M.

The finders 20-1 to 20-7 use, for example, light detection and ranging or laser imaging detection and ranging (LIDAR) configured to measure scattered radiation with respect to radiated light and measure a distance to an object. For example, the finder 20-1 is attached to a front grille or the like, and the finders 20-2 and 20-3 are attached to side surfaces of a vehicle body, door mirrors, the insides of headlights, the vicinity of side lights, or the like. The finder 20-4 is attached to a trunk lid or the like, and the finders 20-5 and 20-6 are attached to side surfaces of the vehicle body, insides of tail lamps, or the like. The above-mentioned finders 20-1 to 20-6 have, for example, detection regions of about 150 degrees in a horizontal direction. In addition, the finder 20-7 is attached to a roof or the like. The finder 20-7 has, for example, a detection region of 360 degrees in the horizontal direction.

The radars 30-1 and 30-4 are, for example, long-distance millimeter wave radars having a detection region in a depth direction that is wider than that of other radars. In addition, the radars 30-2, 30-3, 30-5 and 30-6 are middle-range millimeter wave radars having a detection region in the depth direction that is narrower than that of the radars 30-1 and 30-4. Hereinafter, when the finders 20-1 to 20-7 are not distinguished from each other, they are simply referred to as "finders 20," and when the radars 30-1 to 30-6 are not distinguished from each other, they are simply referred to as "radars 30." The radar 30 detects an object using, for example, a frequency modulated continuous wave (FM-CW) method.

The camera 40 is a digital camera using an individual imaging element such as a charge coupled device (CCD), a complementary metal oxide semiconductor (CMOS), or the like. The camera 40 is attached to an upper section of a front windshield, a back surface of a rear-view mirror, or the like. For example, the camera 40 periodically repeatedly images a side in front of the host vehicle M.

Further, the configuration shown in FIG. 1 is merely an example, and a part of the configuration may be omitted, or other components may be added.

Figure 2:
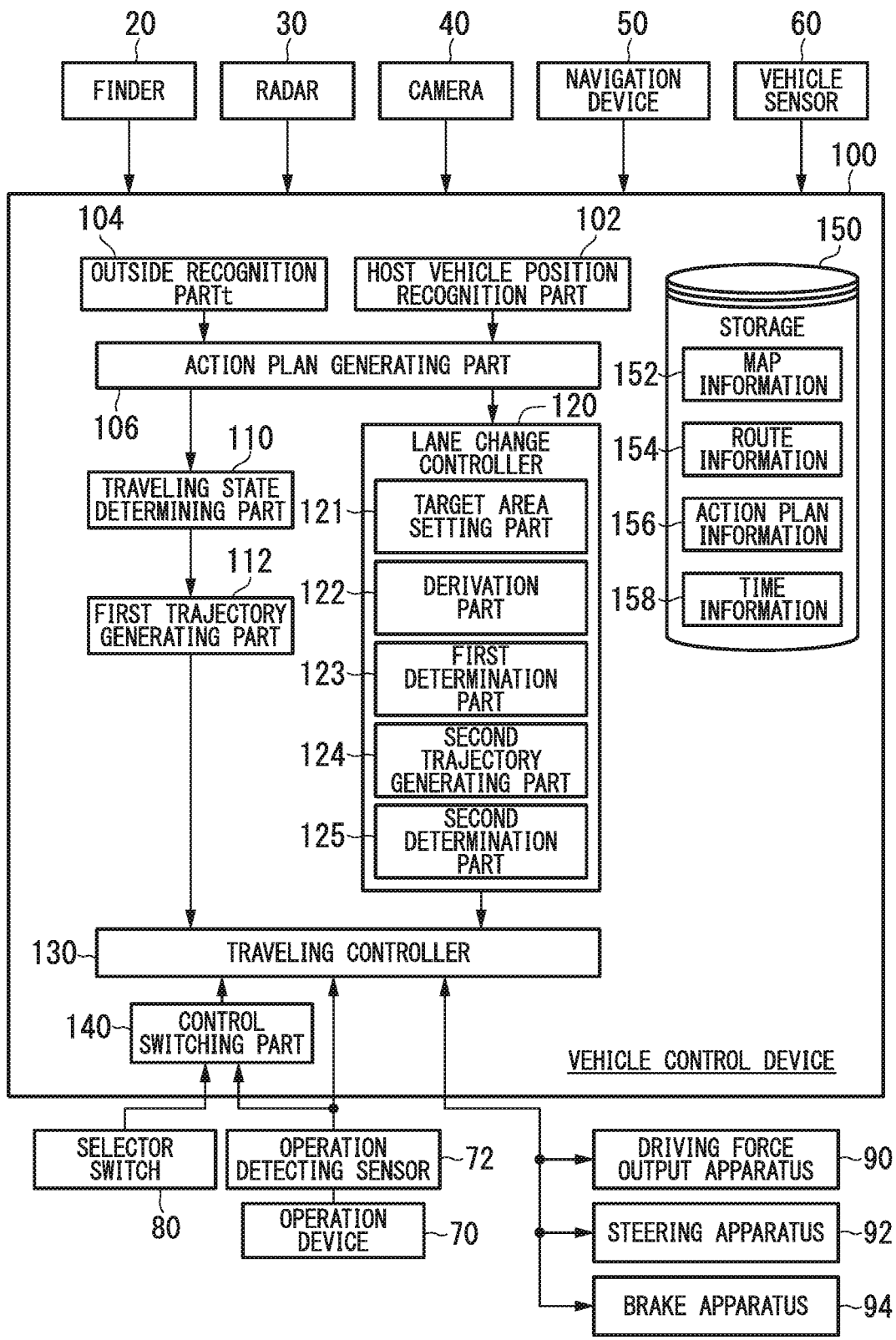
FIG. 2 is a functional configuration figure of the host vehicle having the vehicle control device according to the first embodiment in the center.

FIG. 2 is a functional configuration figure of the host vehicle M having the vehicle control device 100 according to the first embodiment in the center. In addition to the finders 20, the radars 30 and the camera 40, the navigation device 50, a vehicle sensor 60, an operation device 70, an operation detecting sensor 72, a selector switch 80, a driving force output apparatus 90 configured to output a driving force for traveling, a steering apparatus 92, a brake apparatus 94 and the vehicle control device 100 are mounted on the host vehicle M. These devices or instruments are connected to each other by a multiplex communication line such as a controller area network (CAN) communication line or the like, a serial communication line, a wireless communication network, or the like.

The navigation device 50 has a global navigation satellite system (GNSS) receiver, map information (navigation map), a touch panel type display device serving as a user interface, a speaker, a microphone, or the like. The navigation device 50 identifies a position of the host vehicle M using a GNSS receiver, and derives a route from a position to a destination designated by a user. The route derived by the navigation device 50 is stored in a storage 150 as route information 154. A position of the host vehicle M may be identified or complemented by the inertial navigation system (INS) using the output of the vehicle sensors 60.

In addition, the navigation device 50 performs guidance for a route to a destination using speech or navigation display when the vehicle control device 100 operates in a manual driving mode.

Further, the configuration for identifying the position of the host vehicle M may be installed independently from the navigation device 50.

In addition, the navigation device 50 may be realized by a function of a terminal device such as a smartphone, a tablet terminal, or the like, owned by a user. In this case, transmission and reception of information through wireless or wired communication between the terminal device and the vehicle control device 100 are performed.

The vehicle sensor 60 includes a vehicle speed sensor configured to detect a vehicle speed, an acceleration sensor configured to detect an acceleration, a yaw rate sensor configured to detect an angular speed around a vertical axis, an azimuth sensor configured to detect a direction of the host vehicle M, and so on.

The driving force output apparatus 90 includes, for example, an engine and an engine electronic control unit (ECU) configured to control the engine when the host vehicle M is an automobile using an internal combustion engine as a power source. In addition, when the host vehicle M is an electric automobile using an electric motor as a power source, the driving force output apparatus 90 includes a traveling motor and a motor ECU configured to control the traveling motor. In addition, when the host vehicle M is a hybrid automobile, the driving force output apparatus 90 includes an engine, an engine ECU, a traveling motor and a motor ECU.

When the driving force output apparatus 90 includes only an engine, the engine ECU adjusts a throttle opening degree, a shift stage, or the like, of the engine and outputs a traveling driving force (torque) by which the vehicle travels, according to the information input from a traveling controller 130, which will be described below.

In addition, when the driving force output apparatus 90 includes only a traveling motor, the motor ECU adjusts a duty ratio of a PWM signal provided to the traveling motor and outputs the above-mentioned traveling driving force according to the information input from the traveling controller 130.

In addition, when the driving force output apparatus 90 includes an engine and a traveling motor, both of the engine ECU and the motor ECU cooperate with each other to control the traveling driving force according to the information input from the traveling controller 130.

The steering apparatus 92 includes, for example, an electric motor, a steering torque sensor, a steering angle sensor, and so on. The electric motor changes, for example, a direction of a steering wheel by applying a force to a rack and pinion function or the like. The steering torque sensor detects, for example, torsion of a torsion bar when the steering wheel is operated as a steering torque (a steering force). The steering angle sensor detects, for example, a steering angle (or an actual steered angle).

The steering apparatus 92 changes the direction of the steering wheel by driving the electric motor according to the information input from the traveling controller 130.

The brake apparatus 94 is an electric servo brake apparatus including, for example, a brake caliper, a cylinder configured to transmit a hydraulic pressure to the brake caliper, an electric motor configured to generate a hydraulic pressure in the cylinder, and a braking controller.

The braking controller of the electric servo brake apparatus controls the electric motor according to the information input from the traveling controller 130, and a brake torque according to a braking operation is output to the wheels.

The electric servo brake apparatus may include a mechanism configured to transmit a hydraulic pressure generated by an operation of a brake pedal to a cylinder via a master cylinder as a backup.

Further, the brake apparatus 94 is not limited to the above-mentioned electric servo brake apparatus and may be an electronically controlled hydraulic brake apparatus. The electronically controlled hydraulic brake apparatus controls an actuator according to the information input from the traveling controller 130, and transmits the hydraulic pressure of the master cylinder to the cylinder.

In addition, the brake apparatus 94 may include a regeneration brake. The regeneration brake uses the electric power generated by the traveling motor that may be included in the driving force output apparatus 90.

The operation device 70 includes, for example, an accelerator pedal, a steering wheel, a brake pedal, a shift lever, or the like. The operation detecting sensor 72 configured to detect existence or an amount of an operation by a driver is attached to the operation device 70. The operation detecting sensor 72 includes, for example, an accelerator opening degree sensor, a steering torque sensor, a brake sensor, a shift position sensor, and so on.

The operation detecting sensor 72 outputs an accelerator opening degree, a steering torque, a brake pedaling amount, a shift position, and so on, as detection results to the traveling controller 130. Further, instead of this, the detection results of the operation detecting sensor 72 may be directly output to the driving force output apparatus 90, the steering apparatus 92 or the brake apparatus 94.

The selector switch 80 is a switch operated by a driver or the like. The selector switch 80 may be a mechanical switch installed on, for example, a steering wheel, a garnish (a dashboard), or the like, or may be a graphical user interface (GUI) switch installed on a touch panel of the navigation device 50. The selector switch 80 receives an operation of a driver or the like, generates a control mode designating signal that designates a control mode of the traveling controller 130 as any one of an automated driving mode or a manual driving mode, and outputs the control mode designating signal to a control switching part 140.

The automated driving mode is a driving mode in which a vehicle travels in a state in which no operation is performed by a driver (or an amount of operation is lower or an operation frequency is lower than in the manual driving mode), and more specifically, a driving mode of controlling some or all of the driving force output apparatus 90, the steering apparatus 92 and the brake apparatus 94 on the basis of an action plan.

[Vehicle Control Device]

Hereinafter, the vehicle control device 100 will be described. The vehicle control device 100 includes, for example, a host vehicle position recognition part 102, an outside recognition part 104, an action plan generating part 106, a traveling state determining part 110, a first trajectory generating part 112, a lane change controller 120, the traveling controller 130, the control switching part 140 and the storage 150.

Some or all of the host vehicle position recognition part 102, the outside recognition part 104, the action plan generating part 106, the traveling state determining part 110, the first trajectory generating part 112, the lane change controller 120, the traveling controller 130 and the control switching part 140 may be realized as a processor such as a central processing unit (CPU) or the like executing a program. In addition, some or all of those may be realized by hardware such as a large scale integration (LSI), an application specific integrated circuit (ASIC), or the like.

The storage 150 may be realized by a non-volatile recording medium such as a read only memory (ROM), a flash memory, a hard disk drive (HDD), or the like, and a volatile recording medium such as a random access memory (RAM), a resistor, or the like. The program executed by the processor may be previously stored on a non-volatile recording medium of the storage 150, or may be downloaded from an external device via in-vehicle Internet equipment or the like. In addition, the program may be installed on the storage 150 when a portable recording medium on which the program is stored is mounted on a drive device (not shown).

The host vehicle position recognition part 102 recognizes a lane (a traveling lane) in which the host vehicle M is traveling and a relative position of the host vehicle M with respect to the traveling lane on the basis of map information 152 stored in the storage 150 and information input from the finders 20, the radars 30, the camera 40, the navigation device 50 or the vehicle sensors 60.

The map information 152 is, for example, map information that is more accurate than that of a navigation map provided in the navigation device 50, and includes information on a center of lanes, information on boundaries of lanes, or the like.

More specifically, the map information 152 includes road information, traffic regulations information, address information (address/zip code), facilities information, telephone number information, and so on.

The road information includes information that represents a kind of road such as an expressway, a toll road, a national road or a prefectural road, and information such as the number of lanes of a road, a width of each lane, an inclination of a road, a position of a road (three-dimensional coordinates including a longitude, a latitude and a height), a curvature of a curve of a lane, positions of merging and branching points of lanes, marks provided on a road, and so on.

The traffic regulations information includes information on lanes being blocked due to roadwork, traffic accidents, traffic congestion, or the like.

Figure 3:
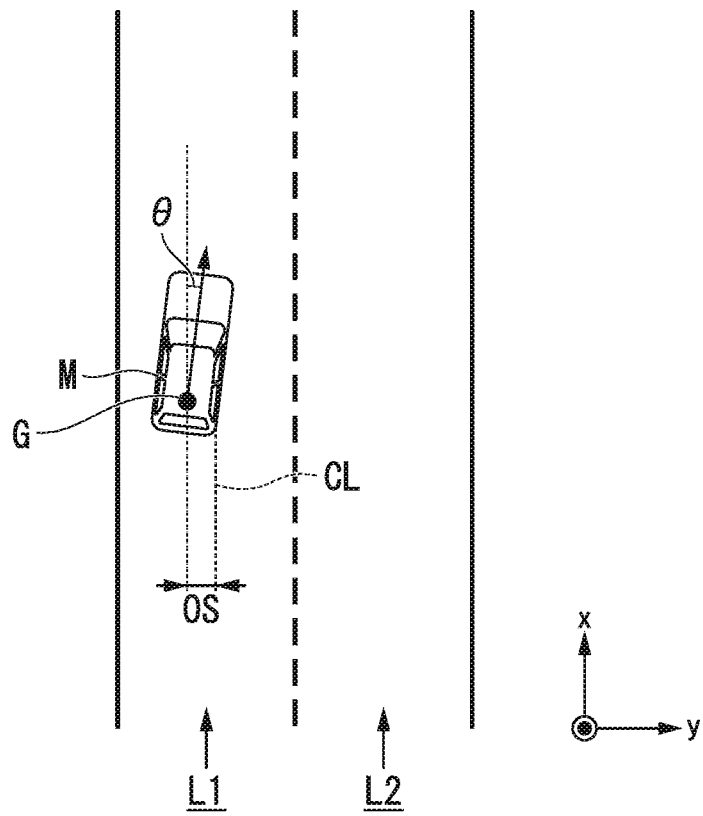
FIG. 3 is a figure showing an aspect in which a relative position of the host vehicle with respect to a traveling lane is recognized by a host vehicle position recognition part.

FIG. 3 is a figure showing an aspect in which a relative position of the host vehicle M with respect to a traveling lane L1 is recognized by the host vehicle position recognition part 102. The host vehicle position recognition part 102 recognizes, for example, a deviation OS from the traveling lane center CL of a reference point G (for example, the center of gravity or the center of a rear wheel axle) of the host vehicle M, and the angle θ formed by the traveling direction of the host vehicle M with respect to the continuation line of the traveling lane center CL as a relative position of the host vehicle M with respect to the traveling lane L1.

Further, instead of this, the host vehicle position recognition part 102 may recognize a position or the like of a reference point on the host vehicle M with respect to any one of the side portions of the traveling lane L1 as a relative position of the host vehicle M with respect to the traveling lane.

The outside recognition part 104 recognizes a state such as a position, a speed, an acceleration, or the like, of a neighboring vehicle on the basis of the information input from the finders 20, the radars 30, the camera 40, and so on.

The neighboring vehicle according to the embodiment is a vehicle that is traveling around the host vehicle M, and a vehicle that is traveling in the same direction as the host vehicle M. A position of the neighboring vehicle may be represented as a representative point including a center of gravity, a corner, or the like, of another vehicle, or may be represented as a region expressed as a profile of another vehicle.

"The state" of the neighboring vehicle may include acceleration of the neighboring vehicle or whether lane change of the neighboring vehicle is being performed (or whether lane change is to be performed) that is ascertained on the basis of information from the various instruments.

In addition, the outside recognition part 104 may recognize positions of a guard rail, an electric pole, a parked vehicle, a pedestrian, or other bodies, in addition to a neighboring vehicle.

The action plan generating part 106 generates an action plan in a predetermined section. The predetermined section is, for example, a section passing through a toll road of an expressway or the like in a route derived by the navigation device 50. Further, there is no limitation thereto, and the action plan generating part 106 may generate an action plan in an arbitrary section.

The action plan is constituted by, for example, a plurality of events, which are performed in sequence. The event includes, for example, a deceleration event of decelerating the host vehicle M, an acceleration event of accelerating the host vehicle M, a lane keeping event of causing the host vehicle M to travel and not to deviate from a traveling lane, a lane change event of changing a traveling lane, an overtaking event of causing the host vehicle M to overtake a preceding vehicle, a branching event of changing to a predetermined lane at a branching point or causing the host vehicle M to travel not to deviate from the current traveling lane, a merging event of accelerating and decelerating the host vehicle M at a lane merging point and changing a traveling lane, and so on.

For example, when a junction (a branching point) is present in a toll road (for example, an expressway or the like), the vehicle control device 100 needs to change a lane or maintain a lane such that the host vehicle M advances in a direction of a destination in an automated driving mode. Accordingly, the action plan generating part 106 sets a lane change event for changing a lane to a desired lane in which the host vehicle M can advance in the direction of the destination from a current position (coordinates) of the host vehicle M to a position (coordinates) of a junction when it is determined that the junction is present on the route with reference to the map information 152. Further, the information that represents the action plan generated by the action plan generating part 106 is stored in the storage 150 as action plan information 156.

Figure 4:
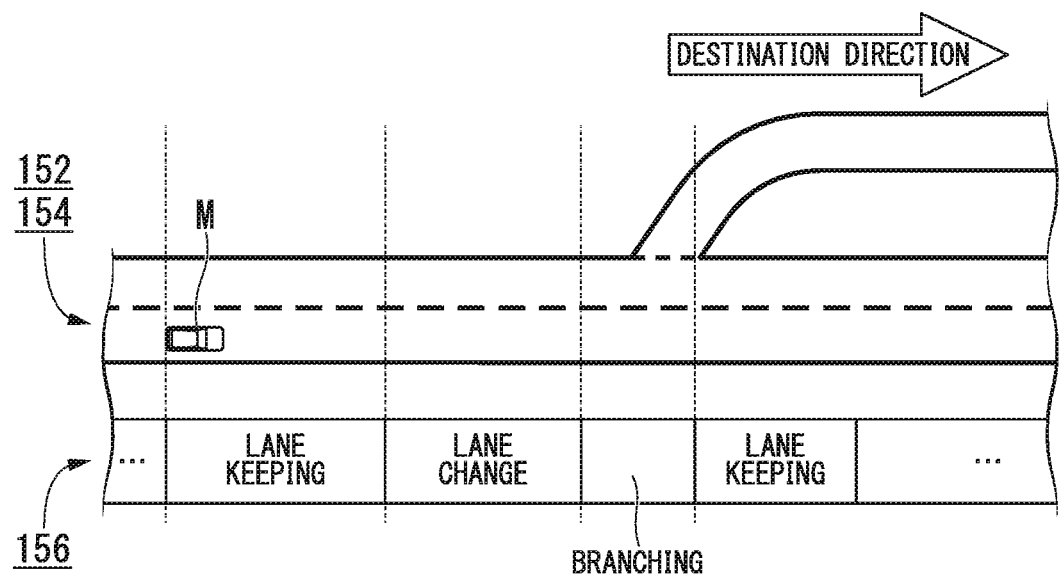
FIG. 4 is a figure showing an example of an action plan generated in a certain section.

FIG. 4 is a figure showing an example of an action plan generated in a certain section. As shown in FIG. 4, the action plan generating part 106 generates an action plan such that scenes generated when the host vehicle M travels along the route to the destination are classified and events appropriate to the individual scenes are performed. Further, the action plan generating part 106 may dynamically change the action plan according to variation in circumstances of the host vehicle M.

The action plan generating part 106 may change (update), for example, the generated action plan on the basis of the state of the outside recognized by the outside recognition part 104. In general, the state of the outside changes constantly while the vehicle is traveling. In particular, when the host vehicle M travels on a road including a plurality of lanes, the distance to other vehicles varies relatively.

For example, when a preceding vehicle decelerates by braking suddenly or a vehicle traveling in the next lane cuts in front of the host vehicle M, the host vehicle M needs to travel while appropriately changing a speed or a lane according to a behavior of the preceding vehicle or a behavior of a vehicle in an adjacent lane. Accordingly, the action plan generating part 106 may change an event set for each control section according to the above-mentioned variation in the state of the outside.

Specifically, the action plan generating part 106 changes an event set to a driving section in which the host vehicle M is planned to travel when a speed of another vehicle recognized by the outside recognition part 104 while the vehicle is traveling exceeds a threshold value or a moving direction of another vehicle that is traveling in a lane adjacent to a host vehicle traveling lane is oriented in a direction toward the host vehicle traveling lane.

For example, in a case in which an event is set such that a lane change event is performed after a lane keeping event, when it is determined that a vehicle is advancing at a speed of a threshold value or more from a rear side in the lane to which the lane change is to be performed during the lane keeping event using the recognition results of the outside recognition part 104, the action plan generating part 106 changes the event after the lane keeping event from lane change to a deceleration event, a lane keeping event, or the like. Accordingly, the vehicle control device 100 can avoid collision of the host vehicle M with a vehicle in a lane to be changed. As a result, the vehicle control device 100 enables safe automated traveling of the host vehicle M even when a variation occurs in a state of the outside.

[Lane Keeping Event]

The traveling state determining part 110 determines a traveling state among any one of constant speed traveling, following traveling, deceleration traveling, curve traveling, obstacle avoidance traveling, and so on, when the lane keeping event included in the action plan is performed by the traveling controller 130.

For example, the traveling state determining part 110 determines the traveling state as constant speed traveling when another vehicle is not present in front of the host vehicle.

In addition, the traveling state determining part 110 determines the traveling state to a following traveling when the host vehicle M travels by following a preceding vehicle.

In addition, the traveling state determining part 110 determines the traveling state to deceleration traveling when deceleration of a preceding vehicle is recognized by the outside recognition part 104 or an event such as stoppage, parking, or the like, is performed.

In addition, the traveling state determining part 110 determines the traveling state to curve traveling when the outside recognition part 104 recognizes that the host vehicle M approaches a curved road.

In addition, the traveling state determining part 110 determines the traveling state to obstacle avoidance traveling when an obstacle in front of the host vehicle M is recognized by the outside recognition part 104.

The first trajectory generating part 112 generates a trajectory on the basis of the traveling state determined by the traveling state determining part 110. The trajectory is a collection (trajectory) of points sampled at predetermined time intervals for future target positions assumed to be reached when the host vehicle M travels on the basis of the traveling state determined by the traveling state determining part 110. Hereinafter, the above-mentioned points may be referred to as trajectory points.

Figure 5:
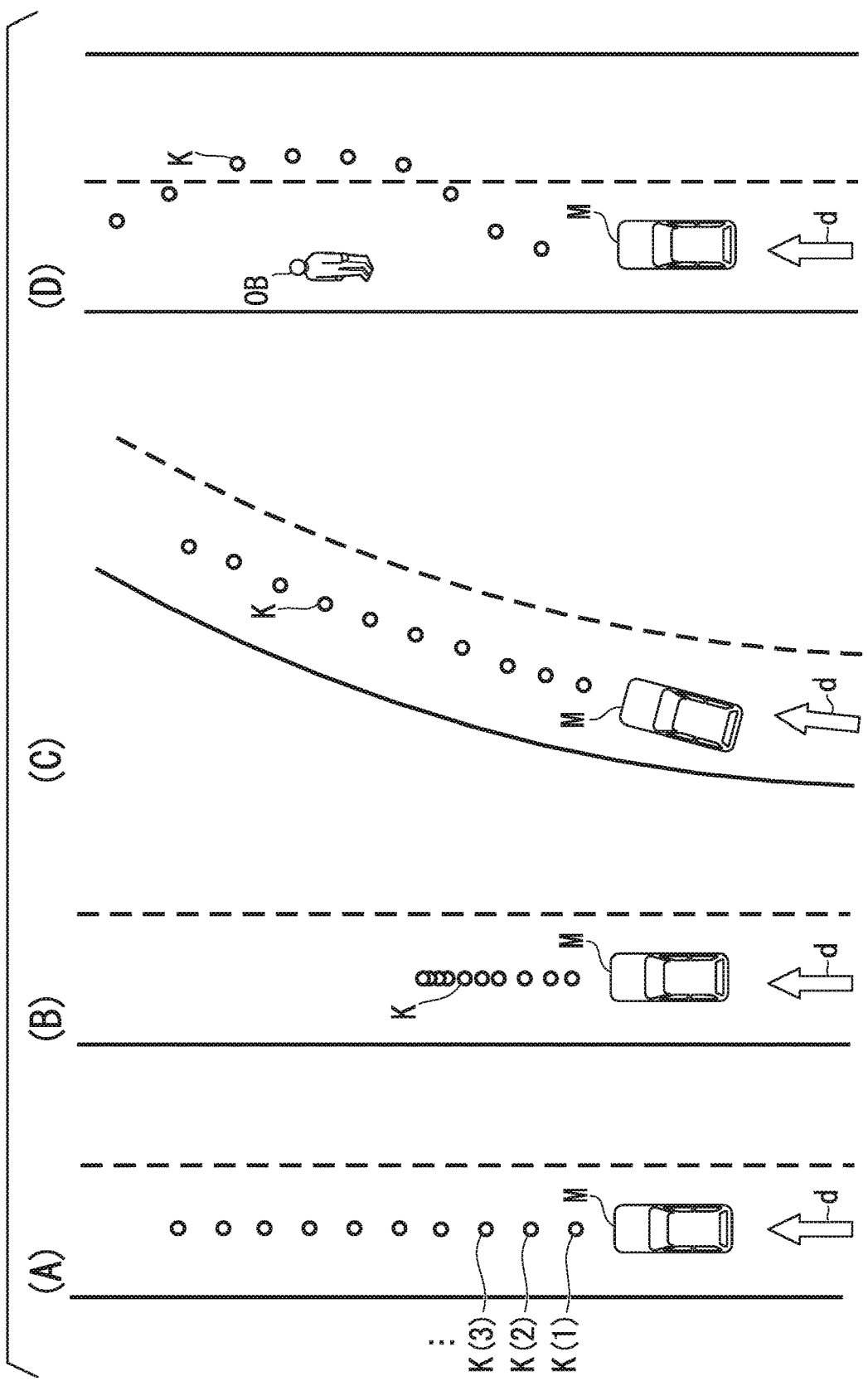
FIG. 5 is a figure showing an example of a trajectory generated by a first trajectory generating part.

FIG. 5 is a figure showing an example of a trajectory generated by the first trajectory generating part 112. As shown in part (A) of FIG. 5, for example, the first trajectory generating part 112 sets target positions in the future that are referred to as K(1), K(2), K(3), . . . whenever a predetermined time Δt elapses from the current time as a trajectory of the host vehicle M with reference to the current position of the host vehicle M. Hereinafter, when the target positions are not distinguished, they are simply expressed as "a target position K."

For example, the number of the target positions K may be determined according to a target time T. For example, the first trajectory generating part 112 sets the target position K on a centerline of the traveling lane at each predetermined time Δt (for example, 0.1 seconds) over 5 seconds when the target time T is 5 seconds, and determines a disposition interval of the plurality of target positions K on the basis of the traveling state. The first trajectory generating part 112 may derive, for example, a centerline of the traveling lane from the information such as a width of a lane or the like included in the map information 152 or may acquire the centerline from the map information 152 when the centerline of the traveling line is previously included in the map information 152.

For example, when the traveling state is determined as constant speed traveling by the traveling state determining part 110, as shown in part (A) of FIG. 5, the first trajectory generating part 112 sets the plurality of target positions K at equal intervals to generate a trajectory.

In addition, when the traveling state is determined as deceleration traveling by the traveling state determining part 110 (including when a preceding vehicle decelerates during the following traveling), as shown in part (B) of FIG. 5, the first trajectory generating part 112 generates a trajectory by widening the interval between the target positions K having an earlier arrival time and narrowing the interval between the target positions K having a later arrival time. Accordingly, when the current position of the host vehicle M approaches the target positions K having a later arrival time, the traveling controller 130, which will be described below, causes the host vehicle M to decelerate.

In addition, as shown in part (C) of FIG. 5, when the road is a curved road, the traveling state determining part 110 determines the traveling state to curve traveling. In this case, the first trajectory generating part 112 generates, for example, a trajectory by disposing the plurality of target positions K according to a curvature of the road while changing a lateral position (a position in a lane width direction) of the host vehicle M in the direction of travel.

In addition, as shown in part (D) of FIG. 5, when an obstacle OB such as a human, a stopped vehicle, or the like, is present on the road in front of the host vehicle M, the traveling state determining part 110 determines the traveling state to obstacle avoidance traveling. In this case, the first trajectory generating part 112 generates a trajectory by disposing the plurality of target positions K such that the host vehicle M travels to avoid the obstacle OB.

[Lane Change Event]

The lane change controller 120 performs control when the lane change event included in the action plan is performed by the traveling controller 130. The lane change controller 120 includes, for example, a target area setting part 121, a derivation part 122, a first determination part 123 configured to determine whether a lane change of the host vehicle M is possible, a second trajectory generating part 124, and a second determination part 125 configured to determine whether a lane change of the host vehicle M is possible. Further, the lane change controller 120 may perform the following processing when a branching event or a merging event is performed by the traveling controller 130. The target area setting part 121 is an example of "a setting part," and the first determination part 123 and the second determination part 125 are an example of "a determination part" configured to determine whether a lane change of a host vehicle is possible. In addition, the second trajectory generating part 124 and the traveling controller 130 are an example of "a controller."

The target area setting part 121 sets a target area TA when a lane of a host vehicle is changed to a lane (an adjacent lane) to which the host vehicle is to advance. The target area TA is, for example, a relative position set between two neighboring vehicles selected in the adjacent lane. Hereinafter, in "the two neighboring vehicles" that travel in the adjacent lane, a vehicle in front of the target area TA is referred to as a preceding reference vehicle mB. In addition, a vehicle that is traveling at rear of the target area TA is referred to as a following reference vehicle mC.

Further, the target area setting part 121 sets the plurality of target areas TA on an adjacent lane L2, and may select one (or a predetermined number of) target area TA from the plurality of target areas TA. For example, the target area setting part 121 sets the target areas TA at rear of the following reference vehicle mC (between the following reference vehicle mC and a vehicle present at rear of thereof), in front of the preceding reference vehicle mB (between the preceding reference vehicle mB and a vehicle present in front thereof), and between the preceding reference vehicle and the following reference vehicle. Then, the target area setting part 121 selects one target area TA from the plurality of target areas TA.

Further, in the embodiment, for simplification in description, the target area setting part 121 will be described as setting one target area TA between the preceding reference vehicle and the following reference vehicle.

In addition, the target area setting part 121 resets the target area TA between the following reference vehicle mC referenced when the target area TA is set and a vehicle present at rear of the following reference vehicle mC at a timing when a speed of the following reference vehicle mC is larger than that of the host vehicle M, for example, when the following reference vehicle mC catches up with the host vehicle M (or when overtakes the host vehicle M) in the case in which it is determined that "the lane change by the host vehicle M is not possible" by the first determination part 123 or the second determination part 125, which will be described below. That is, the target area setting part 121 sets the following reference vehicle mC referenced when the target area TA is set to a new preceding reference vehicle mB, sets a vehicle present at rear of the newly set preceding reference vehicle mB to a new following reference vehicle mC, and resets the target area TA between the preceding reference vehicle mB and the following reference vehicle mC, which are reset.

Further, the target area setting part 121 may set a virtual vehicle obtained by virtually simulating the following reference vehicle mC to an outer edge of a recognition region of a neighboring vehicle using the outside recognition part 104 in a predetermined state when a vehicle is not present at rear of the following reference vehicle mC, i.e., when the following reference vehicle mC is not present when the target area TA is reset. About a speed, the predetermined state includes a state in which a speed of the virtual vehicle is zero, a state in which a speed (or an acceleration) of the virtual vehicle is a threshold value or less, or a state in which a speed of the virtual vehicle is the same as that of the host vehicle M.

For example, the target area setting part 121 may set a virtual vehicle that is stopping in the vicinity of an outer edge of a recognition region using the outside recognition part 104, or may set a virtual vehicle that is traveling at a constant speed.

In addition, about a size of a vehicle, the predetermined state may include a state in which a size of a virtual vehicle is a certain size or more, and a state in which a size of a virtual vehicle is the same as that of the following reference vehicle or the host vehicle M. The size of the virtual vehicle may be a size (the entire length) of a vehicle in an advance direction of the vehicle, may be a size (a vehicle width) of a vehicle in a direction perpendicular to the advance direction of the vehicle, may be a size (a height) of a vehicle in a vertical direction, or may be a combination thereof.

In the embodiment, the target area setting part 121 may set a virtual vehicle having a predetermined speed (acceleration) and a predetermined vehicle width (for example, the same vehicle width as the host vehicle M).

The derivation part 122 derives a time required from starting to termination of a lane change of the host vehicle M (hereinafter, referred to as a time τa that is a time required for a lane change), and a time until the following reference vehicle mC that is traveling at rear of the target area TA set by the target area setting part 121 in the adjacent lane and travels at rear of the host vehicle M catches up with a preceding vehicle mA that is traveling in front of the host vehicle M in the host vehicle traveling lane (hereinafter, referred to as a time τb when a lane change is possible). The time τa is an example of "a first time period" and the time τb is an example of "a second time period."

[Derivation of Time τa that is Time Required for Lane Change]

For example, the derivation part 122 derives the time τa according to the speed Vm of the host vehicle M. The time τa varies according to the speed Vm (or an acceleration or a jerk degree (jerk)) of the host vehicle M. For example, the time τa is shortened as a speed Vm of the host vehicle M is increased, and lengthened as the speed Vm of the host vehicle M is decreased. Hereinafter, when the speed Vm of the host vehicle M is simply referred to as "a speed," an acceleration or a jerk degree may be included.

In addition, the derivation part 122 may weight the time τa derived according to the speed Vm of the host vehicle M. For example, the derivation part 122 weights the time τa on the basis of a movement amount D required for the host vehicle M moving from the current position to the target area TA on the adjacent lane and the angle θ that shows a direction of the host vehicle M with respect to the host vehicle traveling lane. A coefficient that represents a weight may be derived by a function f(D, θ) constituted by the movement amount D and the angle θ as elements. The function f(D, θ) is, for example, a function of replacing a coefficient that is a weight of the time τa using the movement amount D and the angle θ as parameters.

Figure 6:
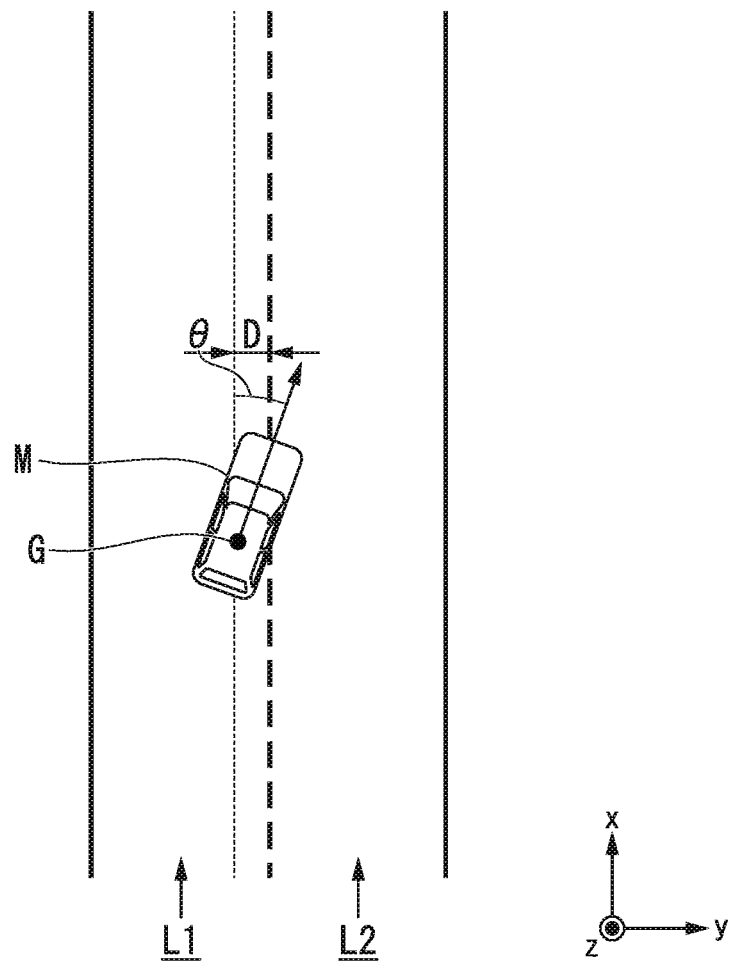
FIG. 6 is a figure for explaining a method of weighting a time required for lane change.

FIG. 6 is a figure for explaining a method of weighting the time τa. The movement amount D is defined as, for example, a relative distance from the reference point G of the host vehicle M to the adjacent lane L2 to which a lane is to be changed, in a point of view in which the vehicle body is overlooked from above as shown in FIG. 6. In this case, the movement amount D is decreased as the host vehicle M approaches the adjacent lane L2 from the host vehicle traveling lane L1. In addition, the angle θ is likely to be the largest when the host vehicle M straddles from a host vehicle traveling lane L1 to the adjacent lane L2. When the movement amount D is small, the time τa is shortened because a distance that the host vehicle M is to move until the lane change is terminated is reduced. In addition, when the angle θ is large, since a circumstance in which the host vehicle M straddles from the host vehicle traveling lane L1 to the adjacent lane L2 is represented, the time τa is likely to be shortened. The derivation part 122 weights the time τa using the function f(D, θ) constituted by the movement amount D and the angle θ that vary with the above-mentioned tendency as elements. Further, the above-mentioned function f may include a term obtained by differentiating the angle θ with time instead of the angle θ as an element.

The derivation part 122 may derive the time τa with reference to the information obtained by considering a relation between the above-mentioned function f and the speed Vm of the host vehicle M (the time information 158 that represents a time required for a lane change).

Figure 7:
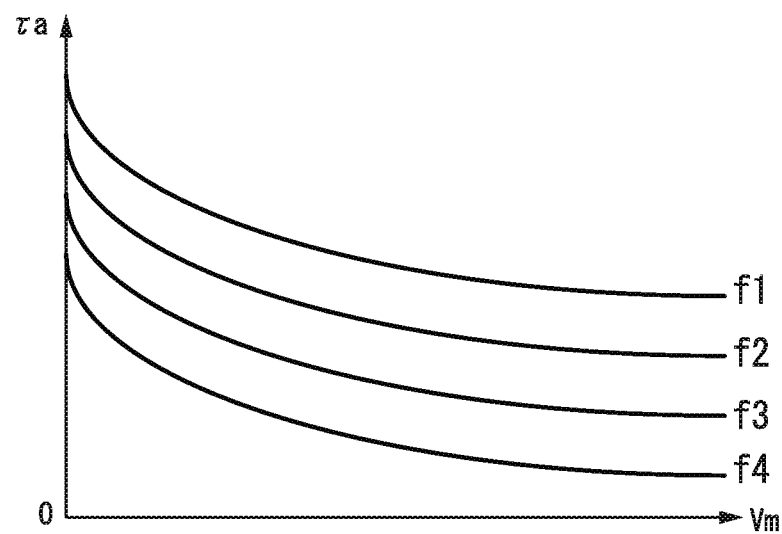
FIG. 7 is a figure showing an example of time information showing a time required for lane change.

FIG. 7 is a figure showing an example of the time information 158. The time information 158 is previously stored in the storage 150. Like an example shown in FIG. 7, a curve line that represents the time τa has a tendency in which the time τa is decreased according to an increase in the speed Vm of the host vehicle M, and several patterns (in an example shown in FIG. 7, 4 patterns) according to the function f (in FIG. 7, f1 to f4) that represents a weight are prepared.

The derivation part 122 selects one from the curve line that represents the times τa that are provided in plural, and derives the time τa corresponding to the speed Vm of the host vehicle M using a function that represents the curve line, on the basis of the movement amount D and the angle θ. Further, the derivation part 122 may drive a weight on the basis of at least one of the movement amount D and the angle θ, which are described above.

[Derivation of Time τb that is Time in which Lane Change is Possible]

The derivation part 122 derives the time τb as a time until a front end (for example, a front bumper) of the following reference vehicle mC reaches a rear end (for example, a rear bumper) of the preceding vehicle mA, for example, when it is assumed that the following reference vehicle mC and the preceding vehicle mA travel in the same lane. Here, it is assumed that the following reference vehicle mC and the preceding vehicle mA travel, for example, in a speed model in which a speed recognized by the outside recognition part 104 is constant. Further, the time τb may include a time in which a constant inter-vehicle distance is added such that the lane change is safely performed. For example, the derivation part 122 derives the time τb by adding a virtual time to collision TTC derived by an inter-vehicle distance (a relative distance) between the following reference vehicle mC and the preceding vehicle mA and a relative speed between the following reference vehicle mC and the preceding vehicle mA.

The first determination part 123 determines that the lane change by the host vehicle M is possible when the time τa derived by the derivation part 122 is shorter than the time τb, and determines that the lane change by the host vehicle M is not possible when the time τa is longer than the time τb.

Figure 8:
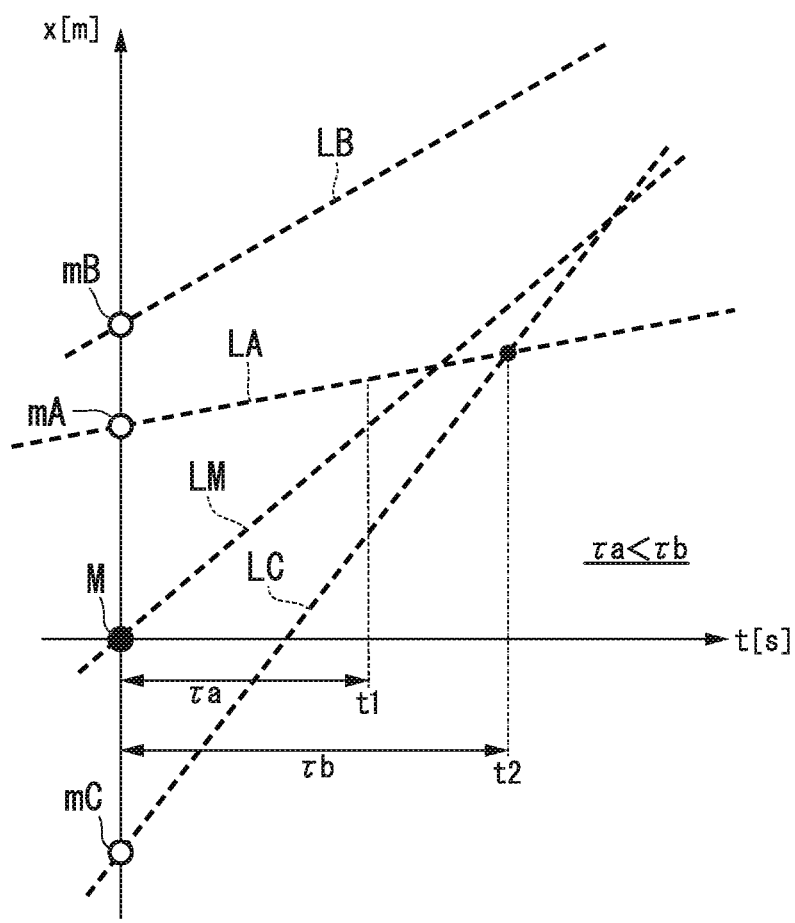
FIG. 8 is a figure showing an example of a speed model in which speeds of a preceding vehicle, a preceding reference vehicle and a following reference vehicle are constant.

FIG. 8 is a figure showing an example of a speed model in which speeds of the preceding vehicle mA, the preceding reference vehicle mB and the following reference vehicle mC are constant. A vertical axis x in FIG. 8 represents an advance direction of each vehicle along a lane, and a horizontal axis t represents a time. In addition, mB, mA, M and mC on an x axis represent a preceding reference vehicle, a preceding vehicle, a host vehicle and following reference vehicle, respectively, and broken lines LB, LA, LM and LC represent a speed of the preceding reference vehicle mB, a speed of the preceding vehicle mA, a speed of the host vehicle M and a speed of the following reference vehicle mC, respectively. In addition, the time t1 represents a time when the time τa elapses from the current time. In addition, a time t2 represents a time when the broken line LA and the broken line LC cross each other.

That is, the time t2 represents a time when the time τb elapses from the current time. In the case of the example in FIG. 8, since the time τa is smaller than the time τb, the first determination part 123 determines that the lane change of the host vehicle M with respect to the target area TA set between the preceding reference vehicle mB and the following reference vehicle mC is possible.

Figure 9:
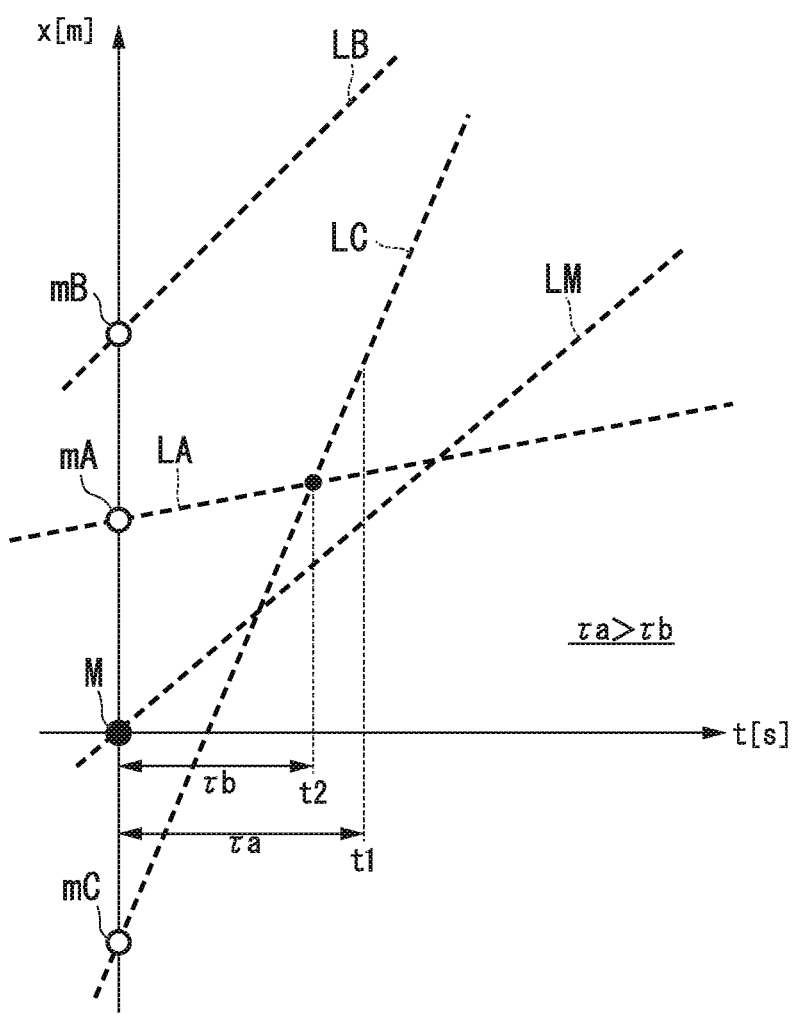
FIG. 9 is a figure showing another example of a speed model in which speeds of a preceding vehicle, a preceding reference vehicle and a following reference vehicle are constant.

In addition, FIG. 9 is a figure showing another example of a speed model in which speeds of the preceding vehicle mA, the preceding reference vehicle mB and the following reference vehicle mC are constant. A vertical axis x, a horizontal axis t, mB, mA, M and mC on an x axis, broken lines LB, LA, LM and LC, a time t1 and a time t2 in FIG. 9 are the same as in FIG. 8, and thus, description thereof will be omitted.

In the case of the example in FIG. 9, since the time τa is longer than the time τb, it is expected that the speed of the following reference vehicle mC is larger than the speed of the preceding vehicle mA, and the following reference vehicle mC overtakes the preceding vehicle mA within a range of the time τa required for the lane change of the host vehicle M. Accordingly, the first determination part 123 determines that the lane change of the host vehicle M with respect to the target area TA set between the preceding reference vehicle mB and the following reference vehicle mC id not possible.

The second trajectory generating part 124 generates a trajectory in which a lane of the host vehicle M is changed to the target area TA according to the determination result by the first determination part 123. Like the trajectory generated by the first trajectory generating part 112, the trajectory is collection (a trajectory) of trajectory points obtained by sampling target positions in the future that are assumed to reach at each predetermined time.

For example, the second trajectory generating part 124 generates a trajectory in which a lane of the host vehicle M is changed to the target area TA when it is determined that the lane change by the host vehicle M can be performed by the first determination part 123. In addition, the second trajectory generating part 124 generates a trajectory in which the current lane is maintained without generating a trajectory in which a lane of the host vehicle M is changed to the target area TA when it is determined that the lane change by the host vehicle M cannot be performed by the first determination part 123. Like the trajectory generated by the first trajectory generating part 112, the trajectory in which the lane is maintained is, for example, a trajectory in which the host vehicle M constantly travels at the current speed, a trajectory in which the current speed is decelerated, a trajectory corresponding to a curvature of a road, or the like.

Figure 10:
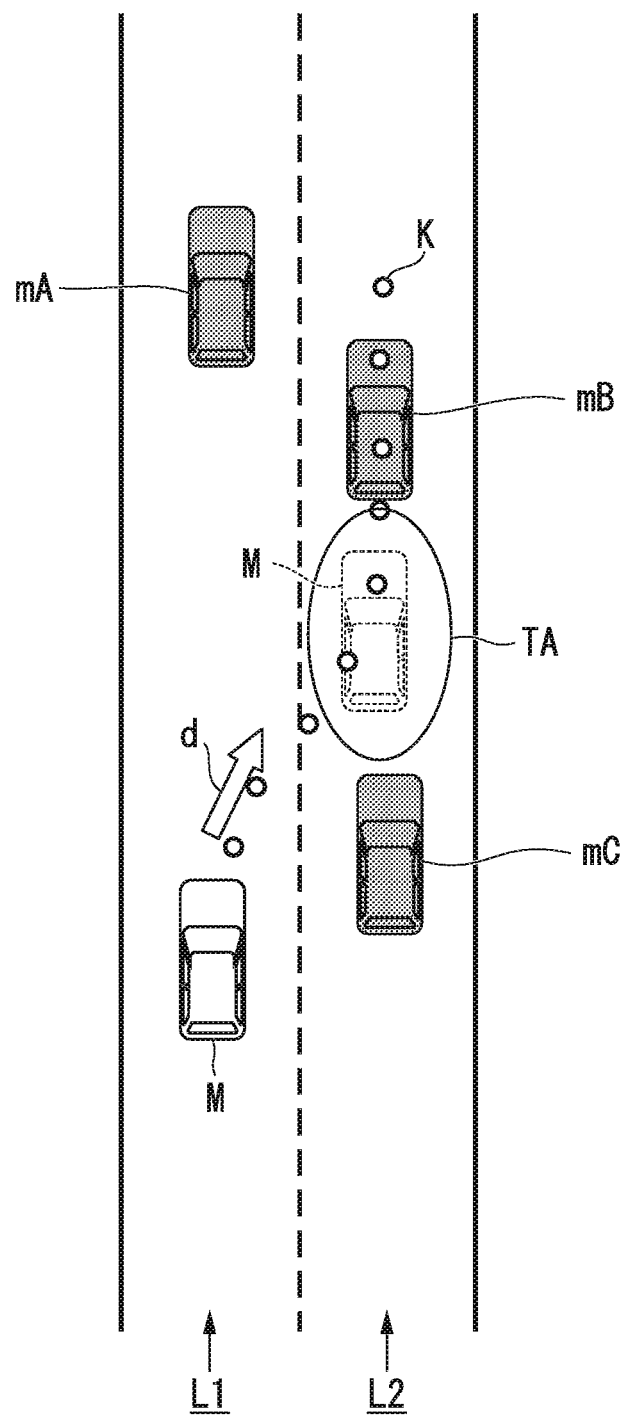
FIG. 10 is a figure for explaining a method of generating a trajectory using a second trajectory generating part.

FIG. 10 is a figure for explaining a method of generating a trajectory using the second trajectory generating part 124. For example, the second trajectory generating part 124 assumes that the preceding reference vehicle mB and the following reference vehicle mC travels in a predetermined speed model (for example, a speed model in which a speed recognized by the outside recognition part 104 is constant), and generates a trajectory such that the host vehicle M at a certain time in the future is present between the preceding reference vehicle mB and the following reference vehicle mC on the basis of the speed model of the three vehicles and the speed of the host vehicle M. For example, the second trajectory generating part 124 smoothly connects from the current position of the host vehicle M to a position of the preceding reference vehicle mB at a time in the future using a polynomial curve line such as a spline curve line or the like, and disposes a predetermined number of target positions K at equal intervals or unequal intervals on the curve line. Here, the second trajectory generating part 124 generates a trajectory such that at least one of the target positions K is disposed in the target area TA.

Figure 11:
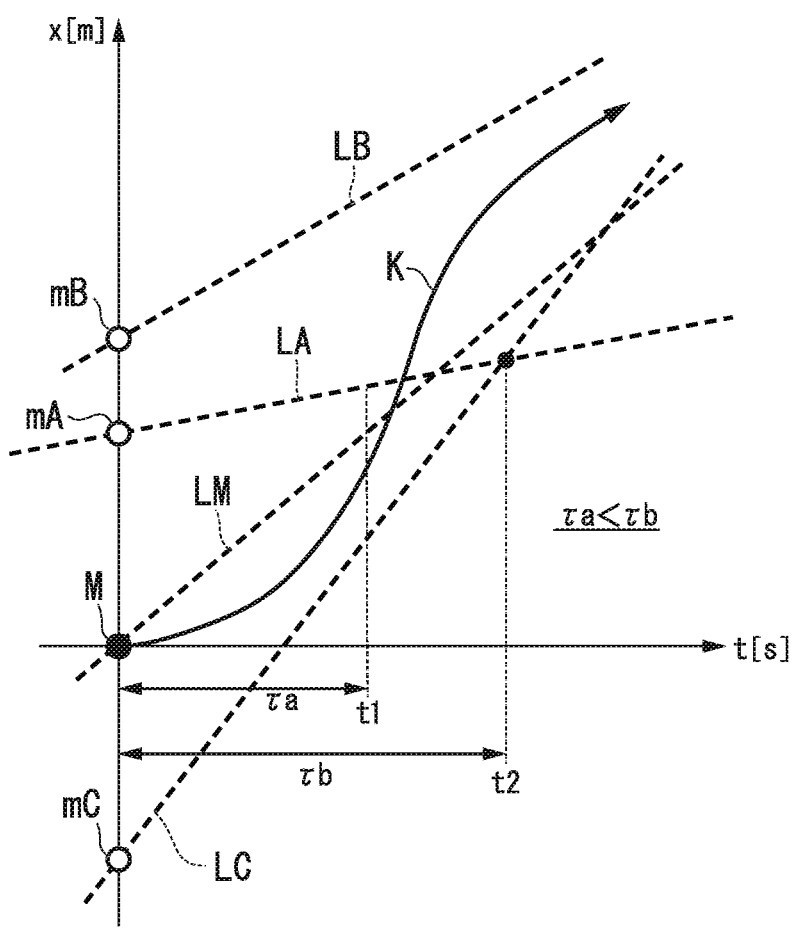
FIG. 11 is a figure showing an example of a trajectory generated by the second trajectory generating part in the case of the speed model shown in FIG. 8.

FIG. 11 is a figure showing an example of a trajectory generated by the second trajectory generating part 124 in the case of the speed model shown in FIG. 8. In the example shown in FIG. 11, the time τa is shorter than the time τb. Accordingly, the second trajectory generating part 124 generates a trajectory (a curve line shown by K in FIG. 11) in which the speed Vm of the host vehicle M becomes larger than a speed Vc of the following reference vehicle mC, for example, before the time t2. Here, the second trajectory generating part 124 may determine degrees of acceleration and deceleration of the host vehicle M according to a speed Vb of the preceding reference vehicle mB. For example, the second trajectory generating part 124 generates a trajectory in which the host vehicle M is accelerated under a range (Vm≤Vb) of a fluctuation range of a speed at which the speed Vb of the preceding reference vehicle mB is maximized. Further, a maximum value of the fluctuation range of the speed may be set to a regulated speed such as a legal speed limit or the like, or may be set to a maximum speed (a maximum speed in performance) that can be output by the host vehicle M. For example, the second trajectory generating part 124 may generate a trajectory in which the host vehicle M is accelerated under a fluctuation range of a speed at which a maximum speed of the host vehicle M is a legal speed limit when the speed Vb of the preceding reference vehicle mB exceeds the legal speed limit.

Figure 12:
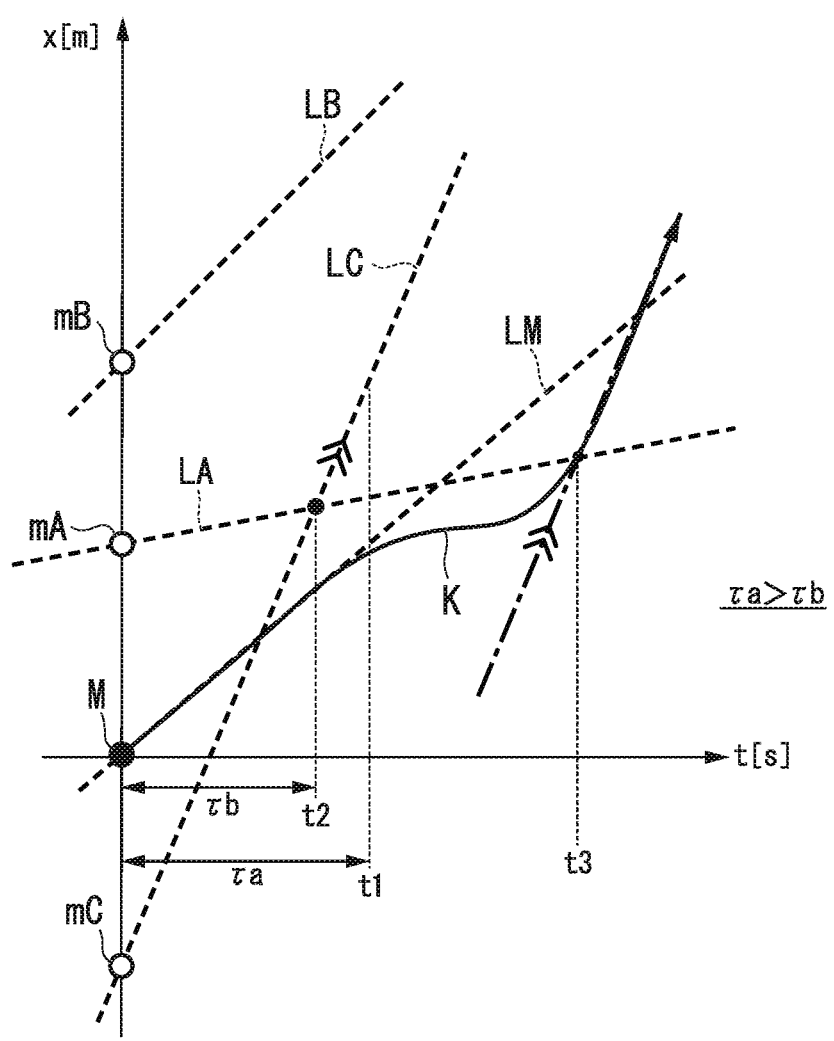
FIG. 12 is a figure showing an example of a trajectory generated by the second trajectory generating part in the case of the speed model shown in FIG. 9.

FIG. 12 is a figure showing an example of a trajectory generated by the second trajectory generating part 124 in the case of the speed model shown in FIG. 9. In the example shown in FIG. 12, the time τa is longer than the time τb. In this case, the second trajectory generating part 124 generates a trajectory in which the host vehicle M constantly travels at the current speed or a trajectory in which the current speed is decelerated, before a timing when the following reference vehicle mC travels parallel to the preceding vehicle mA or before a timing when the following reference vehicle mC travels parallel to the host vehicle M. In the example shown in FIG. 12, the second trajectory generating part 124 generates a trajectory in which the host vehicle M constantly travels at the current speed before a timing (the time t2) when the following reference vehicle mC travels parallel to the preceding vehicle mA.

Then, the second trajectory generating part 124 generates a trajectory in which a lane of the host vehicle M is changed to the target area TA on and after a timing (the time t2) when the following reference vehicle mC travels parallel to the preceding vehicle mA. That is, the second trajectory generating part 124 generates a trajectory in which the lane is changed at rear of the following reference vehicle mC after the following reference vehicle mC overtakes the host vehicle M or the preceding vehicle mA. Here, the second trajectory generating part 124 sets the speed Vm of the host vehicle M under a range (Vm≤Vc) of the fluctuation range of the speed at which the speed Vc of the following reference vehicle mC is maximized, and at the same time, sets the speed Vm of the host vehicle M to a maximum at a timing (a time t3) when the host vehicle M travels parallel to the preceding vehicle mA on the adjacent lane. In the example shown in FIG. 12, at the timing (the time t3) when the host vehicle M travels parallel to the preceding vehicle mA on the adjacent lane, an inclination of a trajectory K is set to be equal to an inclination of the broken line LC. That is, the speed Vm of the host vehicle M is set to the same value as the speed Vc of the following reference vehicle mC. Accordingly, the vehicle control device 100 can reduce a time while the host vehicle M travels parallel to the preceding vehicle mA when the host vehicle M overtakes the preceding vehicle mA. As a result, the vehicle control device 100 can reduce a degree of influence applied to traveling of a neighboring vehicle such as the following reference vehicle mC that is traveling at rear of the host vehicle M, the preceding vehicle mA, or the like, as the host vehicle M performs the lane change.

In the case on which the host vehicle M is traveling on the trajectory generated by the second trajectory generating part 124, the second determination part 125 determines that the lane change by the host vehicle M is not possible when the host vehicle M interferes (or contacts) with any one of the preceding vehicle mA, the preceding reference vehicle mB and the following reference vehicle mC, and determines that the lane change by the host vehicle M is possible when the host vehicle M does not interfere (or does not contact) with any vehicle.

For example, the second determination part 125 determines whether the host vehicle M that is traveling on the trajectory generated by the second trajectory generating part 124 interferes with any one of the preceding vehicle mA, the preceding reference vehicle mB and the following reference vehicle mC having a certain vehicle width in consideration of vehicle widths of the host vehicle M, the preceding vehicle mA, the preceding reference vehicle mB and the following reference vehicle mC.

Figure 13:
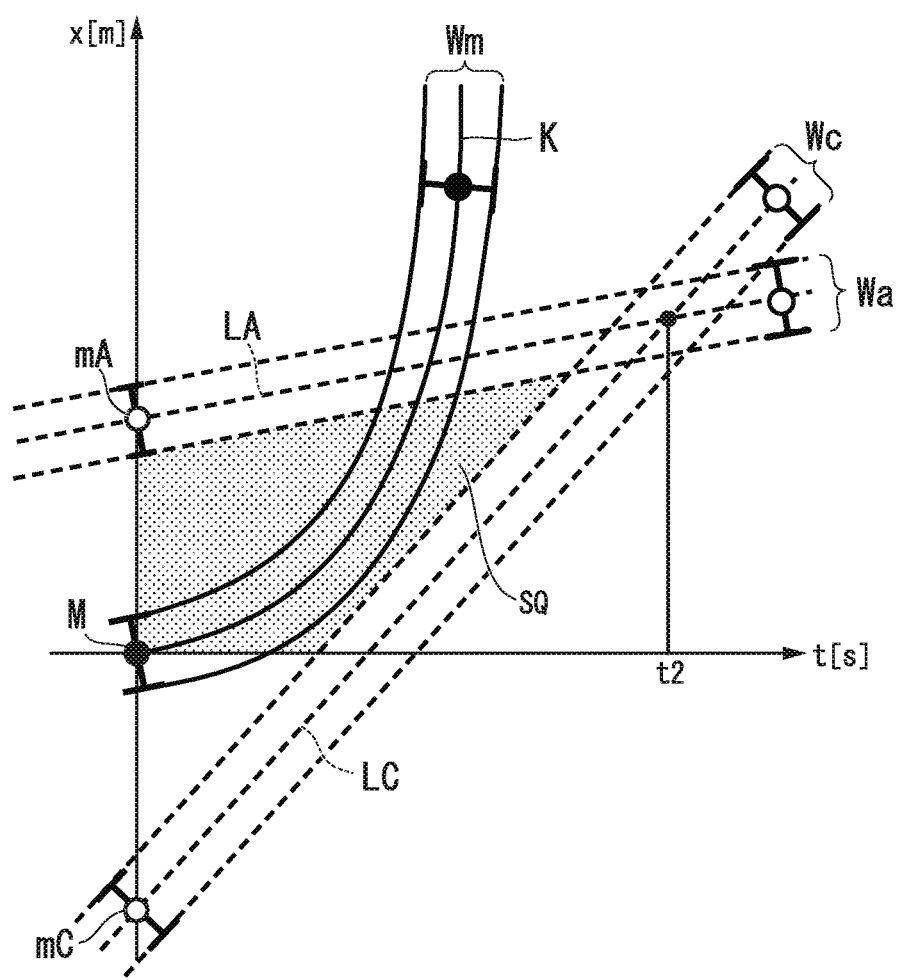
FIG. 13 is a figure for explaining determination processing of a second determination part.

FIG. 13 is a figure for explaining determination processing of the second determination part 125. In the example shown in FIG. 13, a three-vehicle speed model of the host vehicle M, the preceding vehicle mA and the following reference vehicle mC is shown. In addition, a curve line K in FIG. 13 shows a trajectory generated by the second trajectory generating part 124. For example, the second determination part 125 estimates a speed model in consideration of the vehicle width Wm of the host vehicle M, a vehicle width Wa of the preceding vehicle mA, and the vehicle width Wc of the following reference vehicle mC. Here, the second determination part 125 determines whether the host vehicle M interferes with the following reference vehicle mC in a region SQ in consideration of the vehicle width Wa of the preceding vehicle mA and a vehicle width Wc of the following reference vehicle mC when the host vehicle M having a vehicle width Wm travels on the trajectory K. In the example shown in FIG. 13, since the host vehicle M does not interfere with the following reference vehicle mC in the region SQ, the second determination part 125 determines that the lane change by the host vehicle M is possible.

Figure 14:
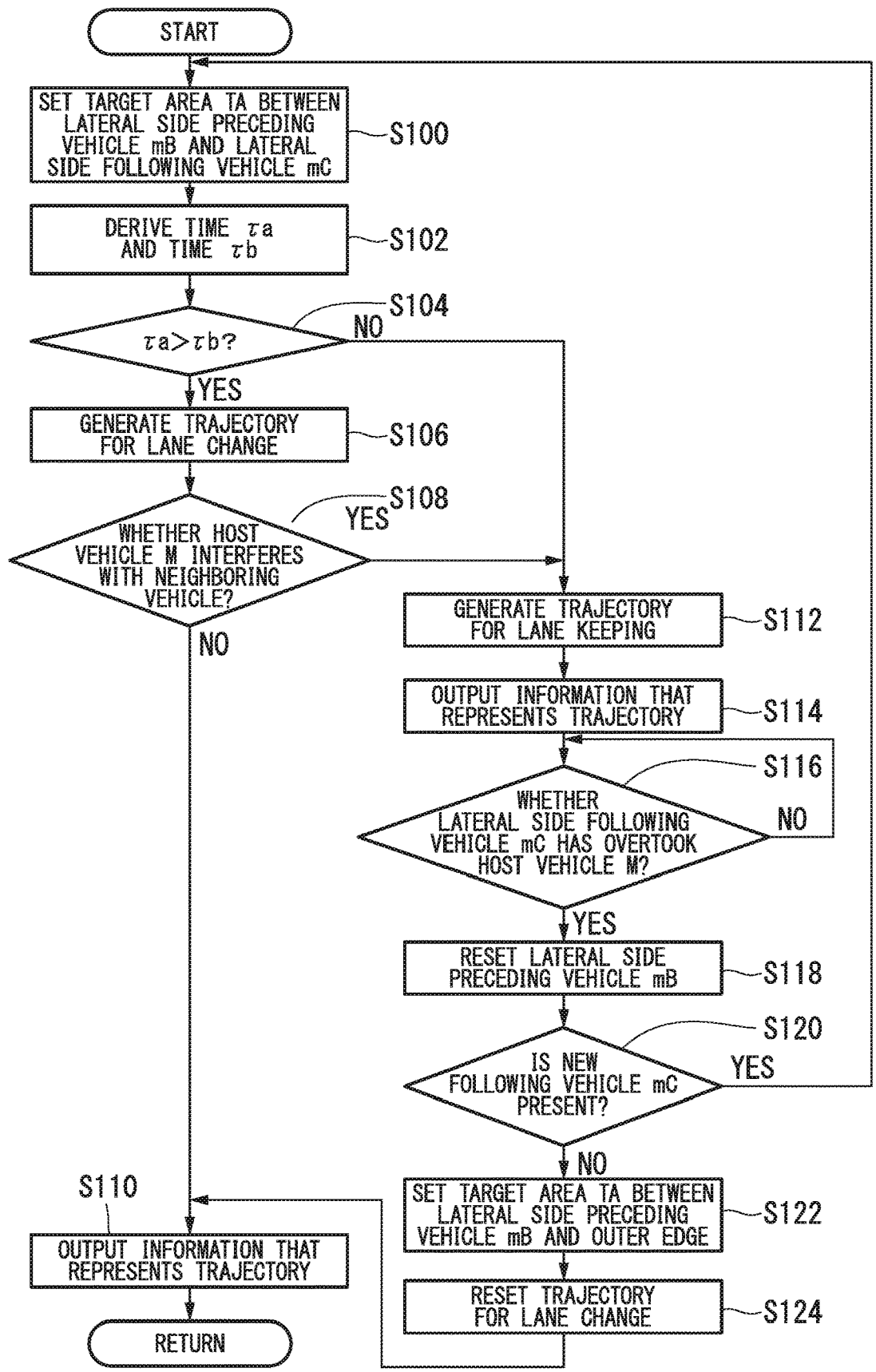
FIG. 14 is a flowchart showing another example of a processing flow of a lane change controller according to the first embodiment.

FIG. 14 is a flowchart showing another example of a flow of processing of the lane change controller 120 according to the first embodiment. The processing of the flowchart is performed in a state in which an action plan is generated by the action plan generating part 106, and repeatedly performed at a predetermined period.

First, the target area setting part 121 sets the target area TA between two vehicles that travel in the adjacent lane among neighboring vehicles recognized by the outside recognition part 104 (step S100). Next, the derivation part 122 derives the time τa that is a time required for the lane change, and the time τb that is a time in which the lane change is possible (step S102).

Next, the first determination part 123 determines whether the time τa derived by the derivation part 122 is shorter than the time τb (step S104). When the time τa is shorter than the time τb, the second trajectory generating part 124 generates a trajectory in which the host vehicle M changes the lane to the target area TA (step S106).

Next, the second determination part 125 determines whether the host vehicle M interferes with a neighboring vehicle when the host vehicle M travels on the trajectory generated by the second trajectory generating part 124 (step S108). When the host vehicle M does not interfere with the neighboring vehicle, the lane change controller 120 outputs the information that represents the trajectory generated by the second trajectory generating part 124 to the traveling controller 130 (step S110), and terminates the processing of the flowchart.

Meanwhile, when the time τa is longer than the time τb or when the host vehicle M interferes with the neighboring vehicle, the second trajectory generating part 124 generates a trajectory in which the host vehicle M maintains the current lane (the host vehicle traveling lane) (step S112). Next, the lane change controller 120 outputs the information that represents the trajectory generated by the second trajectory generating part 124 to the traveling controller 130 (step S114).

Next, the target area setting part 121 determines whether the following reference vehicle mC referenced when the target area TA is set overtakes the host vehicle M (step S116), and resets the following reference vehicle mC that overtakes the host vehicle M to the preceding reference vehicle mB when the following reference vehicle mC overtakes the host vehicle M (step S118).

Next, the target area setting part 121 determines whether a new following reference vehicle mC is present at rear of the preceding reference vehicle mB that was reset (step S120). When the new following reference vehicle mC is present, the target area setting part 121 returns to the processing of the above-mentioned step S100, and resets the target area TA between the preceding reference vehicle mB and the following reference vehicle mC, which are newly set.

Meanwhile, when the new following reference vehicle mC is not present, the target area setting part 121 sets the target area TA between the preceding reference vehicle mB and at rear of the outer edge of the recognition region of the outside recognition part 104 which is located at rear of the preceding reference vehicle mB (step S122). Further, here, the target area setting part 121 returns to the processing of the above-mentioned step S100 when a virtual vehicle obtained by virtually simulating the following reference vehicle mC is provided at rear of the preceding reference vehicle mB and in the vicinity of the outer edge of the recognition region of the outside recognition part 104, and the target area TA may be reset between the preceding reference vehicle mB and the virtual vehicle, which are newly set.

Next, the second trajectory generating part 124 generates a trajectory again to change the lane of the host vehicle M to the target area TA that is reset by the target area setting part 121 (step S124). Then, the lane change controller 120 performs the processing of the above-mentioned step S110, and outputs the information that presents the trajectory generated again by the second trajectory generating part 124 to the traveling controller 130.

Accordingly, the processing of the flowchart is terminated.

[Traveling Control]

The traveling controller 130 sets a control mode to an automated driving mode or a manual driving mode through control by the control switching part 140, and controls a control target including some or all of the driving force output apparatus 90, the steering apparatus 92 and the brake apparatus 94 according to the set control mode. The traveling controller 130 reads the action plan information 156 generated by the action plan generating part 106 during the automated driving mode, and controls the control target on the basis of the event included in the action plan information 156 that was read.

For example, the traveling controller 130 determines a control amount (for example, a rotation number) of an electric motor in the steering apparatus 92 and a control amount (for example, a throttle opening degree of an engine, a shift stage, or the like) of an ECU in the driving force output apparatus 90 according to the trajectory generated by the first trajectory generating part 112 or the second trajectory generating part 124. In addition, the traveling controller 130 determines a control amount of the electric motor in the steering apparatus 92 according to an angle formed by the advance direction of the host vehicle M at each of the target positions K and a direction of the next target position with reference to the target position.

Figure 15:
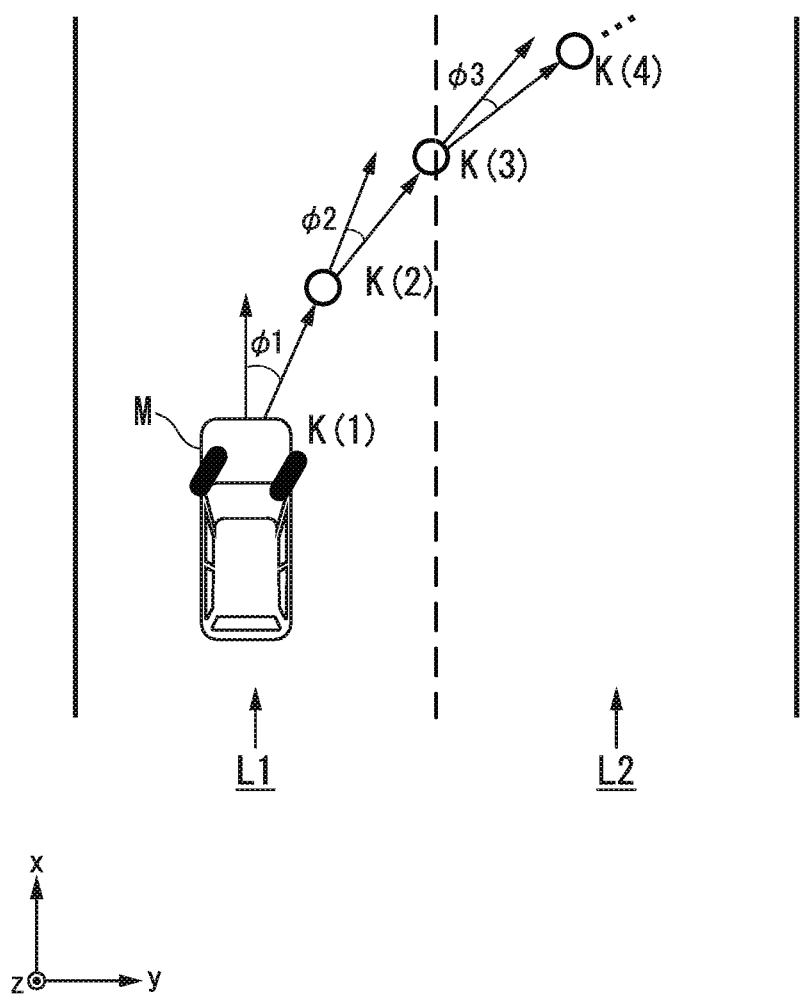
FIG. 15 is a figure showing an example of a scene in which a control amount of a steering apparatus is determined by a traveling controller.

FIG. 15 is a figure showing an example of a scene in which a control amount of the steering apparatus 92 by the traveling controller 130 is determined. An element of a deflection angle (φi configured to cause the host vehicle M to advance with respect to a direction in which a target position K(i+1) at which the host vehicle M is planned to arrive next to the target position K(i) is present is included in a target position K(i) on the trajectory generated by the first trajectory generating part 112 or the second trajectory generating part 124. The deflection angle (φi is, for example, an angle formed between a vehicle axis direction of the host vehicle M at the target position K(i) and a direction in which the target position K(i+1) at which the host vehicle M is planned to arrive is present, when the target position K(i) is referenced.

A steering angle for realizing the deflection angle φi is determined on the basis of vehicle behaviors including a wheel base, a tread interval and a speed of the host vehicle M, in addition to the deflection angle φi. The traveling controller 130 determines a steering angle on the basis of the information such as the deflection angle φi corresponding to each of the target positions K(i), a vehicle speed obtained from the vehicle sensor 60 (or an acceleration or a jerk degree), an angular speed (a yaw rate) around the vertical axis, and determines a control amount of the electric motor in the steering apparatus 92 such that displacement to an extent of the steering angle is applied to the wheels.

In the example of FIG. 15, the host vehicle M is disposed at the target position K(1), and travels on the trajectory generated for the lane change. In this case, the traveling controller 130 determines, for example, a control amount of the electric motor in the steering apparatus 92 such that the wheel is oriented in a rightward direction of FIG. 15 on the basis of the deflection angle φ1 that is an angle between the advance direction of the host vehicle M of the target position K(1) and a direction of the next target position K(2) at which the host vehicle M is to arrive. The traveling controller 130 repeatedly performs the above-mentioned processing at the target positions K(2), K(3), . . . and changes the lane of the host vehicle M.

The traveling controller 130 outputs the information that represents the control amount to the corresponding control target. Accordingly, each of the apparatuses (90, 92, 94) of the control target can control its own apparatus according to the information that represents the control amount input from the traveling controller 130. In addition, the traveling controller 130 appropriately adjusts the determined control amount on the basis of the detection result of the vehicle sensor 60.

Further, the traveling controller 130 controls the control target on the basis of an operation detecting signal output by the operation detecting sensor 72 during the manual driving mode. For example, the traveling controller 130 outputs the operation detecting signal output by the operation detecting sensor 72 to each apparatus of the control target as it is.

In addition, the traveling controller 130 may output the information representing that the lane change is possible when it is determined by the first determination part 123 or the second determination part 125 that "the lane change by the host vehicle is possible" during the manual driving mode to the display device such as a speaker, a liquid crystal display, or the like, mounted on the host vehicle M, the navigation device 50, and so on, and may inform a driver or another occupant of that the lane change is possible.

The control switching part 140 switches the control mode of the host vehicle M by the traveling controller 130 from the automated driving mode to the manual driving mode or from the manual driving mode to the automated driving mode on the basis of the action plan information 156 generated by the action plan generating part 106 and stored in the storage 150. In addition, the control switching part 140 switches the control mode of the host vehicle M by the traveling controller 130 from the automated driving mode to the manual driving mode or from the manual driving mode to the automated driving mode on the basis of the control mode designating signal input from the selector switch 80. That is, the control mode of the traveling controller 130 can be arbitrarily varied during traveling or stoppage according to an operation by a driver or the like.

In addition, the control switching part 140 switches the control mode of the host vehicle M by the traveling controller 130 from the automated driving mode to the manual driving mode on the basis of the operation detecting signal input from the operation detecting sensor 72. For example, the control switching part 140 switches the control mode of the traveling controller 130 from the automated driving mode to the manual driving mode when the operation amount included in the operation detecting signal exceeds the threshold value, i.e., when the operation device 70 receives an operation at the operation amount that exceeds the threshold value. For example, in the case in which the host vehicle M is automatically traveled by the traveling controller 130 set to the automated driving mode, when the steering wheel, the accelerator pedal or the brake pedal is operated by a driver at an operation amount that exceeds the threshold value, the control switching part 140 switches the control mode of the traveling controller 130 from the automated driving mode to the manual driving mode. Accordingly, the vehicle control device 100 can directly switch the control mode to the manual driving mode by an operation instantly performed by a driver without intervention of an operation of the selector switch 80 when a substance such as a human or the like jumps into a roadway or the preceding vehicle suddenly stops. As a result, the vehicle control device 100 can respond to an emergency operation by the driver, and can increase safety during traveling.

In addition, the first determination part 123 of the first embodiment may perform the following determination as primary determination, in addition to determination of possibility of the lane change.

For example, before whether the lane change is possible is determined by performing comparison of lengths of the time τa and the time τb, the first determination part 123 projects the host vehicle M to a lane L2 to which the lane is to be changed, sets a forbidden region RA having a slight marginal distance in a forward/rearward direction, and determines whether the lane change is possible on the basis of existence of detection of the neighboring vehicle present in the forbidden region RA.

Figure 16:
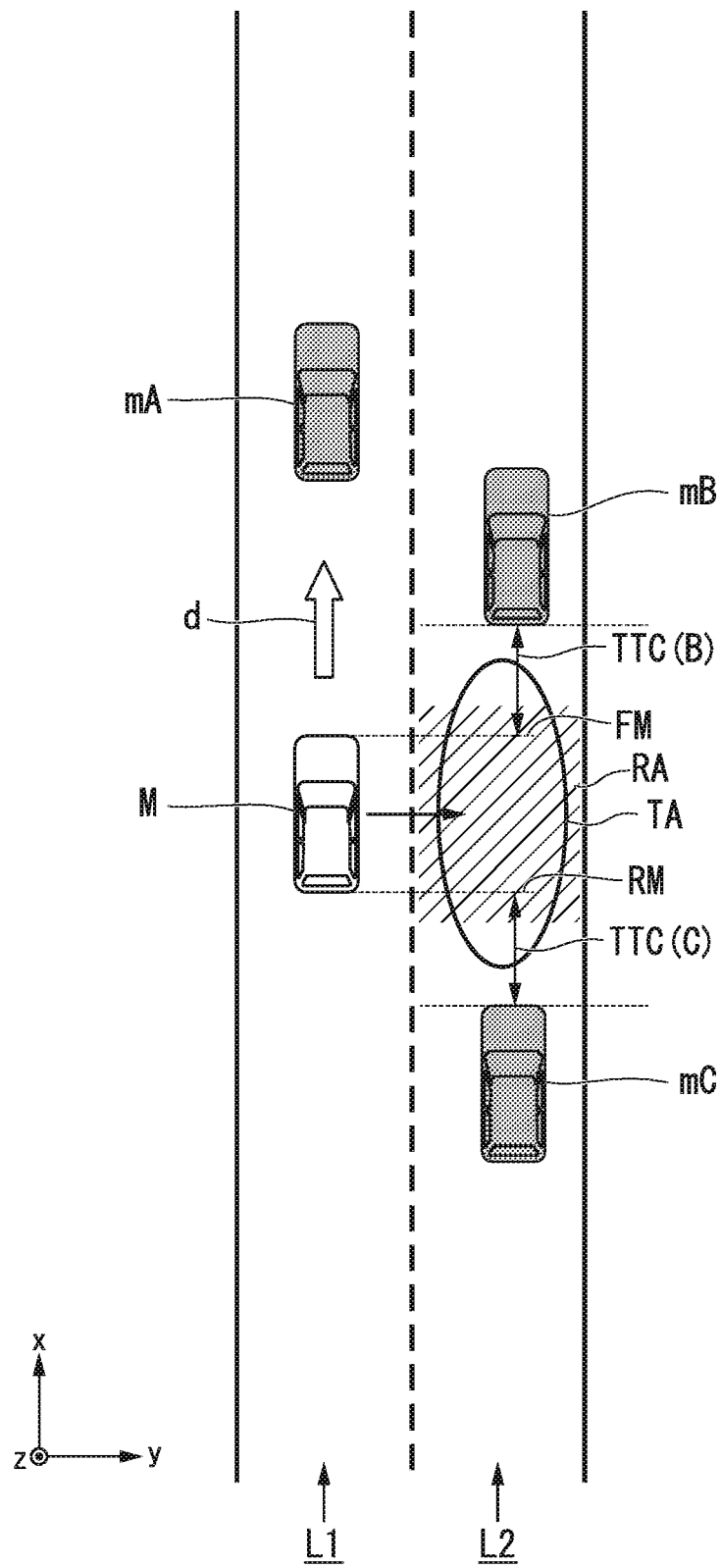
FIG. 16 is a figure for describing a method of setting a forbidden region.

Hereinafter, a method of setting the forbidden region RA will be described with reference to FIG. 16. FIG. 16 is a figure for explaining the method of setting the forbidden region RA. As shown in FIG. 16, the forbidden region RA is set as a region extending from one end to the other end is a lateral direction of the lane L2. If a part of the neighboring vehicle is present in the forbidden region RA, the first determination part 123 determines that the lane change to the target area TA is not possible.

When the neighboring vehicle is not present in the forbidden region RA, the first determination part 123 further determines whether the lane change is possible on the basis of the time to collision TTC between the host vehicle M and the neighboring vehicle. The first determination part 123 assumes, for example, an extension line FM and an extension line RM that virtually extend from a front end and a rear end of the host vehicle M toward the lane L2 to which the lane is to be changed. The first determination part 123 calculates a time to collision TTC(B) between the extension line FM and the preceding reference vehicle mB, and a time to collision TTC(C) between the extension line RM and the following reference vehicle mC. The time to collision TTC (B) is a time derived by dividing a distance between the extension line FM and the preceding reference vehicle mB by a relative speed between the host vehicle M and the preceding reference vehicle mB.

The time to collision TTC(C) is a time derived by dividing a distance between the extension line RM and the following reference vehicle mC by a relative speed between the host vehicle M and the following reference vehicle mC. The first determination part 123 determines that the host vehicle M can change the lane to the target area TA when the time to collision TTC(B) is longer than a threshold value Th(B) and the time to collision TTC(C) is larger than a threshold value Th(C).

In the embodiment, a scene or the like in which a speed of the preceding reference vehicle mB is lower than that of the host vehicle M and thus the lane change becomes difficult is not mentioned. A flowchart of FIG. 14 shows a flow of processing applied to a scene when a speed of the following reference vehicle mC is larger than that of the host vehicle M. In another scene, determination whether the lane change is possible may be performed by another method. For example, a method of determining whether the lane change is possible may be employed when a trajectory is generated and a steering angle during the lane change or a variation in degrees of acceleration and deceleration falls within a threshold value.

According to the vehicle control device 100 of the above-mentioned first embodiment, when the time τa is shorter than the time τb, since it is determined that the lane change by the host vehicle M is possible, the lane of the host vehicle can be changed at an appropriate timing according to a state of the neighboring vehicle.

In addition, according to the vehicle control device 100 of the above-mentioned first embodiment, when the host vehicle M travels on the generated trajectory, as it is determined whether the host vehicle M interferes with any one of the preceding vehicle mA, the following reference vehicle mC and the preceding reference vehicle mB, since it is determined whether the lane change by the host vehicle M is possible, the lane of the host vehicle can be changed at a more appropriate timing.

In addition, according to the vehicle control device 100 of the above-mentioned first embodiment, in the case in which it is determined that the lane change by the host vehicle M is not possible, when the following reference vehicle mC overtakes the host vehicle M, since the speed of the host vehicle M is set to a maximum in the range of the fluctuation range of the speed varying according to the speed of the following reference vehicle mC at the timing when the host vehicle M travels parallel to the preceding vehicle mA on the adjacent lane, a time while the host vehicle M travels parallel to the preceding vehicle mA can be reduced. Accordingly, the vehicle control device 100 can reduce a degree of influence on the traveling of the neighboring vehicle by changing the lane of the host vehicle M. For example, since the vehicle control device 100 can reduce the time while the host vehicle M travels parallel to the preceding vehicle mA, tense atmosphere or sense of unease applied to a driver can be reduced. In addition, since the time while the host vehicle M travels parallel to the preceding vehicle mA can be reduced, in the case in which a vehicle in front of the host vehicle M abruptly stops or an obstacle appears on the host vehicle traveling lane, when the host vehicle M is operated to abruptly avoid the objects, the vehicle control device 100 can retreat the host vehicle M on the adjacent lane without interfering with the preceding vehicle mA.

In addition, according to the vehicle control device 100 of the above-mentioned first embodiment, since the time to that is a time required for the lane change is derived on the basis of one or both of a movement amount required for the host vehicle M to move from the host vehicle M to the target area TA and a direction of the host vehicle M with respect to the host vehicle traveling lane, the time to can be precisely derived according to a traveling state of the host vehicle M. As a result, the vehicle control device 100 can change the lane of the host vehicle at a more appropriate timing.

Second Embodiment

Hereinafter, a second embodiment will be described. A vehicle control device 100A according to the second embodiment is distinguished from the first embodiment in that a timing when the lane change is possible is informed to a driver under a circumstance in which the host vehicle M is manually operated by the driver. Hereinafter, the differences will be described mainly.

Figure 17:
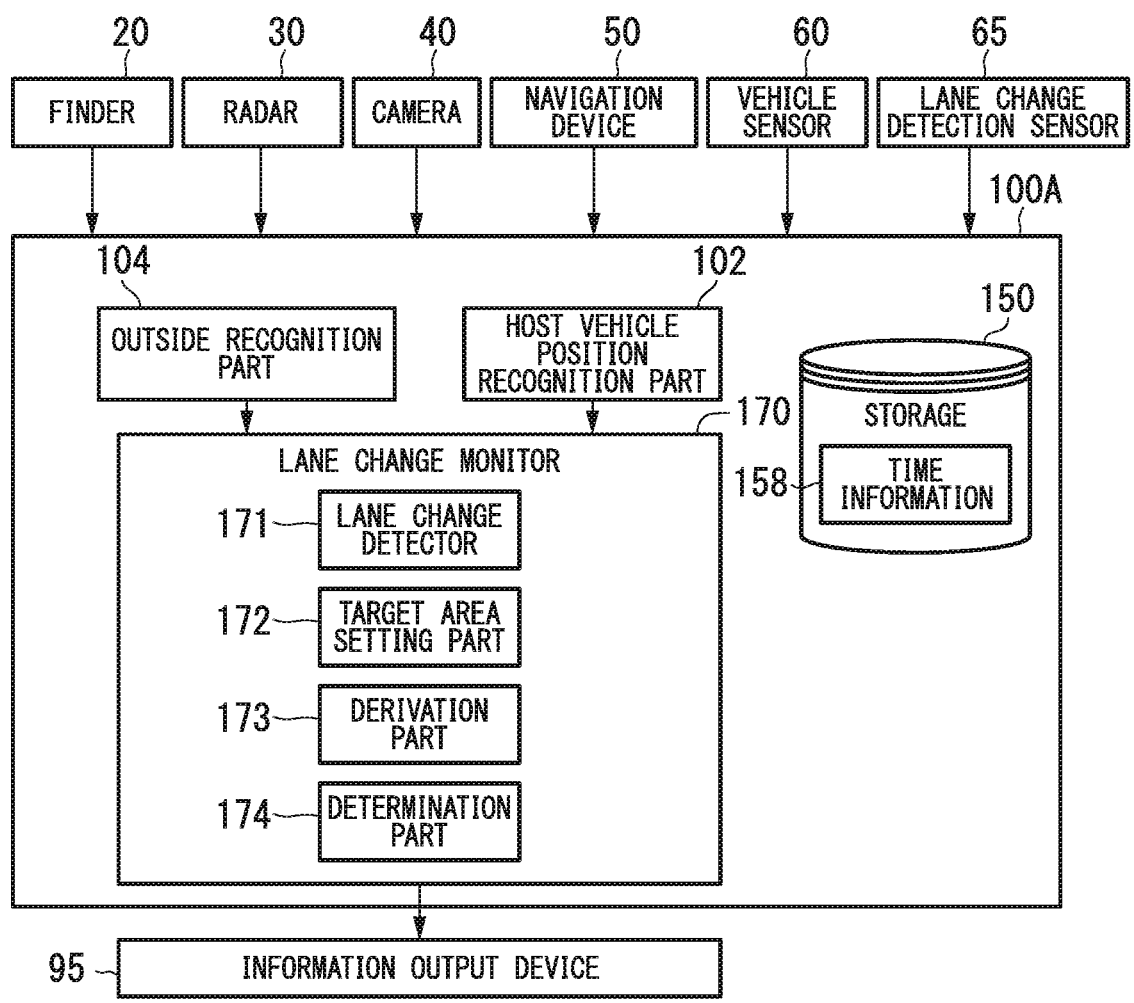
FIG. 17 is a functional configuration figure of the host vehicle M having a vehicle control device according to a second embodiment in the center.

FIG. 17 is a functional configuration figure of the host vehicle M having the vehicle control device 100A according to the second embodiment in the center. In the second embodiment, in addition to the finder 20, the radar 30 and the camera 40, the navigation device 50, the vehicle sensor 60, a lane change detection sensor 65, an information output apparatus 95 and the vehicle control device 100A are mounted on the host vehicle M.

The lane change detection sensor 65 includes, for example, a sensor configured to detect lighting of an indicator, a sensor configured to detect a direction of a vehicle body of the host vehicle M, and so on. The sensor configured to detect the direction of the vehicle body of the host vehicle M is, for example, a steering torque sensor, and detects torsion of a torsion bar when a steering wheel is operated as a steering torque. The lane change detection sensor 65 outputs the information that represents existence of the detected lighting of the indicator, a steering torque, or the like, to the vehicle control device 100A.

The information output apparatus 95 includes, for example, a speaker, a display device, or the like. The information output apparatus 95 outputs speech or displays an image on the basis of the information output by a lane change monitor 170.

The lane change monitor 170 includes a lane change detector 171, a target area setting part 172, a derivation part 173, and a determination part 174 configured to determine whether the lane change of the host vehicle is possible. Some or all of the lane change detector 171, the target area setting part 172, the derivation part 173 and the determination part 174 may be realized as a processor such as a CPU or the like executes a program. In addition, some or all of those may be realized by hardware such as LSI, ASIC, or the like.

The lane change detector 171 may detect an operation of the lane change by the host vehicle M on the basis of some or all of determinations that lighting of the indicator is detected by the lane change detection sensor 65, a steering torque detected by the lane change detection sensor 65 exceeds the threshold value, the host vehicle M is moving from a center of the host vehicle traveling lane toward the adjacent lane when seen from an image imaged by the camera 40, and so on.

Like the first embodiment, the target area setting part 172 sets the target area TA when an operation of the lane change by the host vehicle M is detected by the lane change detector 171. Then, like the above-mentioned processing of the derivation part 122, the derivation part 173 derives the time τa that is a time required for the lane change, and the time τb that is a time in which the lane change is possible. Like the above-mentioned processing of the first determination part 123, the determination part 174 determines whether the lane change is possible on the basis of the time τa and the time τb derived by the derivation part 173, or determines whether the lane change is possible by setting the forbidden region RA. The determination part 174 outputs the information representing that the lane change is possible to the information output apparatus 95 and informs a driver of the timing in which the lane change is possible, when it is determined that the lane change is possible. In addition, the determination part 174 may output the information representing that the lane change is possible to the navigation device 50 and inform a driver of the timing in which the lane change is possible.

According to the vehicle control device 100A of the above-mentioned second embodiment, since the timing in which the lane change is possible is informed to the driver, like the above-mentioned first embodiment, the lane of the host vehicle can be changed at an appropriate timing according to a state of the neighboring vehicle.

Hereinabove, while the present invention has been described with reference to the above-mentioned embodiments, the present invention is not limited to the above-mentioned embodiments and various modifications and substitutions may be made without departing from the scope of the present invention.

REFERENCE SIGNS LIST

20 . . . finder, 30 . . . radar, 40 . . . camera, 50 . . . navigation device, 60 . . . vehicle sensor, 70 . . . operation device, 72 . . . operation detecting sensor, 80 . . . selector switch, 90 . . . driving force output apparatus, 92 . . . steering apparatus, 94 . . . brake apparatus, 100 . . . vehicle control device, 102 . . . host vehicle position recognition part, 104 . . . outside recognition part, 106 . . . action plan generating part, 110 . . . traveling state determining part, 112 . . . first trajectory generating part, 120 . . . lane change controller, 121 . . . target area setting part, 122 . . . derivation part, 123 . . . first determination part, 124 . . . second trajectory generating part, 125 . . . second determination part, 130 . . . traveling controller, 140 . . . control switching part, 150 . . . storage, M . . . host vehicle

What is claim is:

1. A vehicle control device comprising:
   a setting part that sets a target area on an adjacent lane adjacent to a host vehicle traveling lane on which a host vehicle is traveling, the target area being an area used as a target when the host vehicle changes lane to the adjacent lane;
   a derivation part that derives a first time period which is a time length required from a start to a termination of a lane change by the host vehicle, and a second time period which is a time length required for a following reference vehicle, traveling at rear of the target area set by the setting part in the adjacent lane adjacent to the host vehicle traveling lane, to catch up with a preceding vehicle traveling in front of the host vehicle in the host vehicle traveling lane;
   a determination part that determines that the lane change by the host vehicle is possible, in a case at least a condition in which the first time period derived by the derivation part is shorter than the second time period is satisfied; and a controller that performs the lane change of the host vehicle, in a case it is determined by the determination part that the lane change by the host vehicle is possible.

2. The vehicle control device according to claim 1, wherein the controller automatically performs the lane change of the host vehicle to the adjacent lane by automatically controlling at least one of an acceleration and a deceleration, or a steering of the host vehicle on the basis of the first time period and the second time period derived by the derivation part.

3. The vehicle control device according to claim 1, wherein the setting part sets the target area at rear of the following reference vehicle when a speed of the following reference vehicle is greater than that of the host vehicle, in a case it is determined by the determination part that the lane change by the host vehicle is not possible.

4. The vehicle control device according to claim 3, wherein the controller sets the speed of the host vehicle to maximum in a range of a fluctuation range of the speed which varies according to the speed of the following reference vehicle at a timing on which the host vehicle travels parallel with the preceding vehicle on the adjacent lane, in a case the target area has been set at rear of the following reference vehicle.

5. The vehicle control device according to claim 1, wherein the controller generates a trajectory for traveling the host vehicle to the target area on the basis of the first time period and the second time period derived by the derivation part, and the controller automatically performs the lane change of the host vehicle to the adjacent lane by automatically controlling at least one of an acceleration and a deceleration, or a steering of the host vehicle on the basis of the generated trajectory, in a case it is determined by the determination part that the lane change by the host vehicle is possible.

6. The vehicle control device according to claim 5, wherein the condition further includes a condition in which any one of the preceding vehicle, the following reference vehicle, or a preceding reference vehicle which is traveling in front of the target area does not interfere with the host vehicle, in a case the host vehicle is traveling on the trajectory generated by the controller.

7. The vehicle control device according to claim 1, wherein the derivation part derives the first time period on the basis of one or both of a movement amount, which is required for a movement of the host vehicle in order to move to the target area on the adjacent lane from a located position of the host vehicle, and a direction of the host vehicle with respect to the host vehicle traveling lane.

8. A method installed in a computer configured to control a vehicle, the method comprising:

setting a target area on an adjacent lane adjacent to a host vehicle traveling lane on which a host vehicle is traveling, the target area being an area used as a target when the host vehicle changes lane to the adjacent lane;

deriving a first time period which is a time length required from a start to a termination of a lane change by the host vehicle, and a second time period which is a time length required for a following reference vehicle, traveling at rear of the set target area set in the adjacent lane adjacent to the host vehicle traveling lane, to catch up with a preceding vehicle traveling in front of the host vehicle in the host vehicle traveling lane;

determining that the lane change by the host vehicle is possible, in a case at least a condition in which the derived first time period is shorter than the second time period is satisfied; and performing the lane change of the host vehicle, in a case it is determined that the lane change by the host vehicle is possible.

9. A non-transitory computer readable medium comprising a vehicle control program that when executed by an in-vehicle computer, comprising a processor, performs operations, comprising:

setting a target area on an adjacent lane adjacent to a host vehicle traveling lane on which a host vehicle is traveling, the target area being an area used as a target when the host vehicle changes lane to the adjacent lane;

deriving a first time period which is a time length required from a start to a termination of a lane change by the host vehicle, and a second time period which is a time length required for a following reference vehicle, traveling at rear of the set target area set in the adjacent lane adjacent to the host vehicle traveling lane, to catch up with a preceding vehicle traveling in front of the host vehicle in the host vehicle traveling lane;

determining that the lane change by the host vehicle is possible, in a case at least a condition in which the derived first time period is shorter than the second time period is satisfied; and performing the lane change of the host vehicle, in a case it is determined that the lane change by the host vehicle is possible.

* * * * *